US012168386B2

(12) United States Patent
Kim et al.

(10) Patent No.: US 12,168,386 B2
(45) Date of Patent: Dec. 17, 2024

(54) VEHICLE THERMAL MANAGEMENT SYSTEM

(71) Applicants: Hyundai Motor Company, Seoul (KR); Kia Corporation, Seoul (KR)

(72) Inventors: Tae Han Kim, Seoul (KR); Jae Hyun Song, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 258 days.

(21) Appl. No.: 17/869,123

(22) Filed: Jul. 20, 2022

(65) Prior Publication Data

US 2023/0173871 A1  Jun. 8, 2023

(30) Foreign Application Priority Data

Dec. 8, 2021 (KR) .................. 10-2021-0174903

(51) Int. Cl.
  B60H 1/00 (2006.01)

(52) U.S. Cl.
  CPC ..... B60H 1/00278 (2013.01); B60H 1/00342 (2013.01); B60H 1/00392 (2013.01); *B60H 2001/00307* (2013.01)

(58) Field of Classification Search
  CPC ............ B60H 1/00278; B60H 1/00342; B60H 1/00392; B60H 2001/00307; B60H 1/32284; B60H 1/323
  See application file for complete search history.

(56) References Cited

U.S. PATENT DOCUMENTS

| 11,325,443 | B2 | 5/2022 | Kim et al. |
| 2020/0384827 | A1 | 12/2020 | Oh et al. |
| 2020/0391570 | A1 | 12/2020 | Lee et al. |
| 2021/0039474 | A1 | 2/2021 | Kim et al. |
| 2022/0097487 | A1 | 3/2022 | Jin et al. |
| 2023/0382181 | A1* | 11/2023 | Dong ................. B60H 1/00278 |

FOREIGN PATENT DOCUMENTS

| KR | 20200063382 A | 6/2020 |
| KR | 20200065180 A | 6/2020 |
| KR | 20200086494 A | 7/2020 |
| KR | 20200103391 A | 9/2020 |
| KR | 20210017119 A | 2/2021 |

* cited by examiner

*Primary Examiner* — Cassey D Bauer
(74) *Attorney, Agent, or Firm* — Slater Matsil, LLP

(57) ABSTRACT

An embodiment vehicle thermal management system includes a first refrigeration cycle including a first refrigerant loop in which a first refrigerant is circulated, a battery cooling subsystem including a battery coolant loop in which a battery-side coolant is circulated, wherein the battery coolant loop is fluidly connected to a battery, a second refrigeration cycle including a second refrigerant loop in which a second refrigerant is circulated, the second refrigeration cycle comprising a condenser thermally connected to the battery cooling subsystem, a refrigerant chiller thermally connecting the first refrigeration cycle and the second refrigeration cycle, and a battery chiller thermally connecting the second refrigeration cycle and the battery cooling subsystem, wherein the condenser is located on a downstream side of the battery chiller in the second refrigerant loop.

20 Claims, 8 Drawing Sheets

VEHICLE THERMAL MANAGEMENT SYSTEM

CROSS-REFERENCE TO RELATED APPLICATIONS

This application claims the benefit of Korean Patent Application No. 10-2021-0174903, filed on Dec. 8, 2021, which application is hereby incorporated herein by reference.

TECHNICAL FIELD

The present disclosure relates to a vehicle thermal management system.

BACKGROUND

With a growing interest in energy efficiency and environmental issues, there is a demand for development of eco-friendly vehicles that can replace internal combustion engine vehicles. Such eco-friendly vehicles are classified into electric vehicles which are driven by using fuel cells or electricity as a power source and hybrid vehicles which are driven by using an engine and a battery.

Existing electric vehicles and hybrid vehicles have employed an air-cooled battery cooling system using interior cold air. In recent years, research is underway on a water-cooled battery cooling system that cools the battery by water cooling in order to extend all electric range (AER) to 300 km (200 miles) or more. Specifically, energy density may be increased by adopting a system that cools the battery in a water-cooled manner using a heating, ventilation, and air conditioning (HVAC) system, a radiator, and the like. In addition, the water-cooled battery cooling system may make the battery system compact by reducing gaps between battery cells, and improve battery performance and durability by maintaining a uniform temperature between the battery cells.

In order to implement the above-described water-cooled battery cooling system, research is being conducted on a vehicle thermal management system integrated with a powertrain cooling subsystem for cooling an electric motor and power electronics, a battery cooling subsystem for cooling a battery, and an HVAC subsystem for heating or cooling air in a passenger compartment.

The vehicle thermal management system may include a battery chiller configured to transfer heat between a refrigeration cycle of the HVAC subsystem and a battery coolant loop. The battery cooling subsystem may employ an indirect cooling system in which the battery chiller cools a battery-side coolant using the refrigeration cycle and the battery-side coolant cooled by the battery chiller cools the battery.

When the temperature of the battery is relatively lowered, the output energy of the battery may be significantly reduced due to low-temperature polarization voltage characteristics of the battery, and thus AER of the electric vehicle may be relatively reduced in winter compared to in summer.

When the temperature of the battery is relatively lowered, the vehicle thermal management system according to the related art may be configured to increase the temperature of the battery to a predetermined temperature by an electric heater that heats the battery-side coolant.

However, the electric heater is relatively expensive, and the power consumption of the electric heater is relatively high, which may result in an increase in the overall electric energy consumption of the vehicle thermal management system.

The above information described in this background section is provided to assist in understanding the background of the inventive concept, and may include any technical concept which is not considered as the prior art that is already known to those skilled in the art.

SUMMARY

The present disclosure relates to a vehicle thermal management system. Particular embodiments relate to a vehicle thermal management system designed to improve thermal management performance with respect to a battery.

Embodiments of the present disclosure can solve problems occurring in the prior art while advantages achieved by the prior art are maintained intact.

An embodiment of the present disclosure provides a vehicle thermal management system that can reduce the waste of electric energy by removing an electric heater, and can significantly improve thermal management performance with respect to a battery.

According to an embodiment of the present disclosure, a vehicle thermal management system may include a first refrigeration cycle having a first refrigerant loop circulating a first refrigerant, a second refrigeration cycle having a second refrigerant loop circulating a second refrigerant, a battery cooling subsystem having a battery coolant loop through which a battery-side coolant circulates, a refrigerant chiller thermally connecting the first refrigeration cycle and the second refrigeration cycle, and a battery chiller thermally connecting the second refrigeration cycle and the battery cooling subsystem. The battery coolant loop may be fluidly connected to a battery, the second refrigeration cycle may include a condenser thermally connected to the battery cooling subsystem, and the condenser may be located on the downstream side of the battery chiller in the second refrigerant loop.

As described above, the first refrigeration cycle may be thermally connected to the second refrigeration cycle through the refrigerant chiller, the second refrigeration cycle may be thermally connected to the battery cooling subsystem through the battery chiller, the condenser of the second refrigeration cycle may be located on the downstream side of the battery chiller, and the condenser of the second refrigeration cycle may be configured to heat the battery-side coolant using the second refrigerant, and thus the heated battery-side coolant may increase the temperature of the battery appropriately.

The second refrigeration cycle may include a chiller-side bypass conduit configured to allow the second refrigerant to bypass the battery chiller, and a chiller-side three-way valve configured to control the flow of the second refrigerant between the chiller-side bypass conduit and the second refrigerant loop.

As the condenser of the second refrigeration cycle is configured to heat the battery-side coolant, and the flow of the second refrigerant is adjusted by the chiller-side bypass conduit and the chiller-side three-way valve in the second refrigerant loop, the heated battery-side coolant may increase the temperature of the battery.

The second refrigeration cycle may include a second compressor located on the upstream side of the condenser, and an exterior heat exchanger located on the downstream side of the condenser.

The second refrigeration cycle may further include an auxiliary expansion valve disposed between the condenser and the exterior heat exchanger.

During the cooling of the battery, the exterior heat exchanger may serve as a condenser that condenses the second refrigerant by transferring heat to the ambient air. When the temperature of the battery increases, the exterior heat exchanger may serve as an evaporator that evaporates the second refrigerant by absorbing heat from the ambient air.

The first refrigeration cycle may include a first compressor, an interior condenser located on the downstream side of the first compressor, a cooling-side expansion valve located on the downstream side of the interior condenser, and an evaporator located on the downstream side of the cooling-side expansion valve.

The first refrigeration cycle may further include a branch conduit branching off from the first refrigerant loop, and the refrigerant chiller may be configured to transfer heat between the branch conduit and the second refrigerant loop.

Accordingly, the first refrigerant may be distributed to the evaporator and the refrigerant chiller at a predetermined ratio.

The refrigerant chiller may include a first passage fluidly connected to the branch conduit and a second passage fluidly connected to the second refrigerant loop.

Accordingly, the refrigerant chiller may transfer heat between the first refrigerant passing through the first passage and the second refrigerant passing through the second passage. Since the temperature of the second refrigerant passing through the second passage of the refrigerant chiller is higher than the temperature of the first refrigerant passing through the first passage of the refrigerant chiller, the heat may be transferred from the second refrigerant passing through the second passage to the first refrigerant passing through the first passage, and accordingly the second refrigerant passing through the second passage of the refrigerant chiller may be cooled and condensed, and the first refrigerant passing through the first passage of the refrigerant chiller may be evaporated (vaporized). The first passage of the refrigerant chiller may serve as an evaporator in the first refrigeration cycle, and the second passage of the refrigerant chiller may serve as a condenser in the second refrigeration cycle. Thus, the refrigerant chiller may be an integrated structure of the evaporator for evaporating the first refrigerant and the condenser for condensing the second refrigerant.

The first refrigeration cycle may include a first chiller-side expansion valve located on the upstream side of the refrigerant chiller.

A portion of the first refrigerant may be directed into the evaporator through the cooling-side expansion valve, and a remaining portion of the first refrigerant may be directed into the refrigerant chiller through the first chiller-side expansion valve.

The vehicle thermal management system may further include a water-cooled heat exchanger configured to transfer heat between the first refrigerant loop and the battery coolant loop.

The water-cooled heat exchanger may include a first passage fluidly connected to the first refrigerant loop and a second passage fluidly connected to the battery coolant loop. The first refrigeration cycle may include a heating-side expansion valve located on the upstream side of the first passage of the water-cooled heat exchanger.

In the water-cooled heat exchanger, the first refrigerant circulating in the first refrigerant loop may exchange heat with the battery-side coolant circulating in the battery coolant loop of the battery cooling subsystem. During a heating operation of an HVAC subsystem, the water-cooled heat exchanger may be configured to evaporate the refrigerant received from the interior condenser using the heat received from the battery cooling subsystem. During a cooling operation of the HVAC subsystem, the water-cooled heat exchanger may be configured to condense the refrigerant received from the interior condenser.

The battery chiller may include a first passage fluidly connected to the battery coolant loop, and a second passage fluidly connected to the second refrigerant loop.

The first passage may be located on the downstream side of the battery in the battery coolant loop, and the second passage may be located on the downstream side of the refrigerant chiller in the second refrigerant loop.

Accordingly, the second passage of the battery chiller may receive the second refrigerant from the second passage of the refrigerant chiller. As the temperature of the second refrigerant passing through the second passage of the battery chiller is lower than the temperature of the battery-side coolant passing through the first passage of the battery chiller, the battery-side coolant may be cooled by the second refrigerant in the battery chiller, and the second refrigerant may be heated and evaporated by the battery-side coolant in the battery chiller. The battery-side coolant cooled by the battery chiller may be directed into a coolant passage of the battery by a first battery-side pump so that the battery may be optimally cooled.

The second refrigeration cycle may include a second chiller-side expansion valve located on the upstream side of the second passage of the battery chiller.

The second chiller-side expansion valve may adjust the flow of the refrigerant or the flow rate of the refrigerant into the second passage of the battery chiller, and the second chiller-side expansion valve may be configured to expand the refrigerant received from the refrigerant chiller.

The battery cooling subsystem may include the battery chiller located on the downstream side of the battery, a battery radiator located on the downstream side of the battery chiller, a first battery bypass conduit allowing the battery-side coolant to bypass the battery radiator, a second battery bypass conduit allowing the battery-side coolant to bypass the battery and the battery chiller, and a three-way valve adjusting a flow direction of the battery-side coolant.

The condenser may include a first passage fluidly connected to the battery coolant loop and a second passage fluidly connected to the second refrigerant loop. The first passage of the condenser may be fluidly connected to the second battery bypass conduit.

As the battery-side coolant passing through the first passage of the condenser exchanges heat with the second refrigerant passing through the second passage of the condenser, the second refrigerant may be cooled and condensed by the battery-side coolant, and the battery-side coolant may be heated by the second refrigerant.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
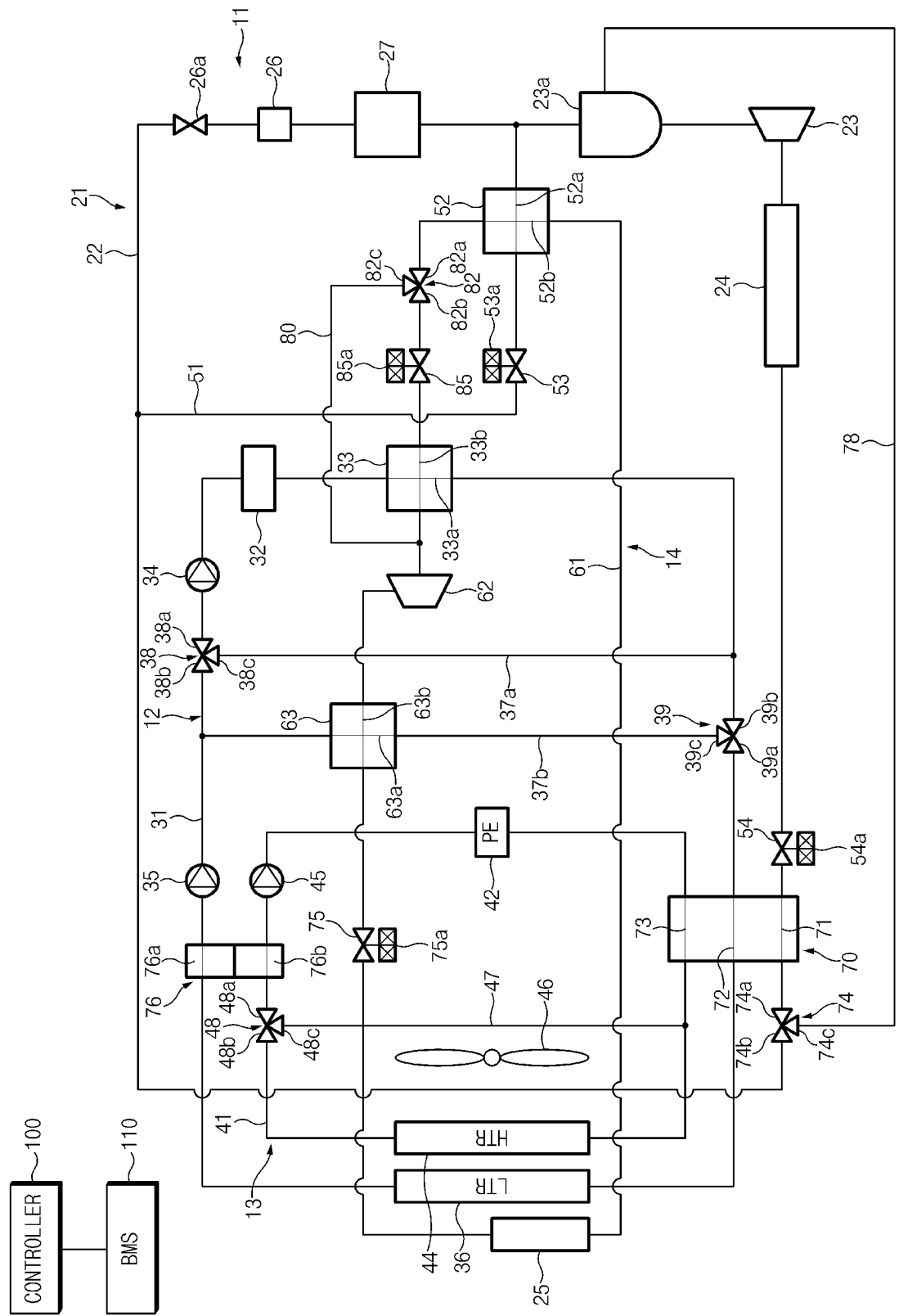
FIG. 1 illustrates a vehicle thermal management system according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system according to an exemplary embodiment of the present disclosure may include a heating, ventilation, and air conditioning (HVAC) subsystem 11 including a first refrigerant loop 22 through which a first refrigerant circulates, a battery cooling subsystem 12 including a battery coolant loop 31 through which a battery-side coolant for cooling a battery 32 circulates, and a powertrain cooling subsystem 13 including a powertrain coolant loop 41 through which a powertrain-side coolant for cooling powertrain components 42 (e.g., an electric motor and power electronics) circulates.

The HVAC subsystem 11 may include a first refrigeration cycle 21 having the first refrigerant loop 22 through which the first refrigerant circulates. The first refrigerant loop 22 may be fluidly connected to a first compressor 23, an interior condenser 24, a heating-side expansion valve 54, a water-cooled heat exchanger 70, a cooling-side expansion valve 26, and an evaporator 27. The first refrigerant may sequentially pass through the first compressor 23, the interior condenser 24, the heating-side expansion valve 54, the water-cooled heat exchanger 70, the cooling-side expansion valve 26, and the evaporator 27 through the first refrigerant loop 22.

The first compressor 23 may be configured to compress the first refrigerant. In particular, the first compressor 23 may be configured to compress the refrigerant received from the evaporator 27 and/or a refrigerant chiller 52. According to an exemplary embodiment, the first compressor 23 may be an electric compressor which is driven using electric energy.

The HVAC subsystem 11 may further include an accumulator 23a located on the upstream side of the first compressor 23 in the first refrigerant loop 22. The accumulator 23a may be located between the evaporator 27 and the first compressor 23, and the accumulator 23a may separate a liquid refrigerant from the refrigerant which is received from the evaporator 27, thereby preventing the liquid refrigerant from entering the first compressor 23.

The interior condenser 24 may be disposed inside an HVAC casing (not shown). The interior condenser 24 may be configured to primarily condense the first refrigerant received from the first compressor 23, and accordingly the air passing through the interior condenser 24 may be heated by the interior condenser 24.

The water-cooled heat exchanger 70 may transfer heat between the first refrigerant loop 22 of the HVAC subsystem 11, the battery coolant loop 31 of the battery cooling subsystem 12, and the powertrain coolant loop 41 of the powertrain cooling subsystem 13. Accordingly, the first refrigerant circulating in the first refrigerant loop 22 may exchange heat with the battery-side coolant circulating in the battery coolant loop 31 of the battery cooling subsystem 12 and the powertrain-side coolant circulating in the powertrain coolant loop 41 of the powertrain cooling subsystem 13. Specifically, the water-cooled heat exchanger 70 may be disposed on the downstream side of the interior condenser 24 in the first refrigerant loop 22. The water-cooled heat exchanger 70 may include a first passage 71 fluidly connected to the first refrigerant loop 22, a second passage 72 fluidly connected to the battery coolant loop 31, and a third passage 73 fluidly connected to the powertrain coolant loop 41.

The HVAC subsystem 11 may further include a bypass conduit 78 connecting a downstream point of the first passage 71 of the water-cooled heat exchanger 70 and the accumulator 23a. An inlet of the bypass conduit 78 may be connected to the downstream point of the water-cooled heat exchanger 70, and an outlet of the bypass conduit 78 may be connected to the accumulator 23a. Specifically, the inlet of the bypass conduit 78 may be connected to the downstream point of the first passage 71 of the water-cooled heat exchanger 70, and the outlet of the bypass conduit 78 may be connected to the accumulator 23a. A three-way valve 74 may be disposed at a junction between the inlet of the bypass conduit 78 and the first refrigerant loop 22. The three-way valve 74 may include a first port 74a fluidly connected to the first passage 71 of the water-cooled heat exchanger 70, a second port 74b fluidly connected to the cooling-side expansion valve 26 and a first chiller-side expansion valve 53, and a third port 74c fluidly connected to the inlet of the bypass conduit 78. The three-way valve 74 may be switched to allow any one of the second port 74b and the third port 74c to selectively communicate with the first port 74a. For example, when the three-way valve 74 is switched to allow the third port 74c to communicate with the first port 74a (that is, when the three-way valve 74 is switched to open the inlet of the bypass conduit 78), the first refrigerant having passed through the first passage 71 of the water-cooled heat exchanger 70 may be directed into the first compressor 23 through the bypass conduit 78. That is, when the inlet of the bypass conduit 78 is opened by the switching of the three-way valve 74, the first refrigerant may bypass the evaporator 27 and the refrigerant chiller 52. When the three-way valve 74 is switched to allow the second port 74b to communicate with the first port 74a (that is, when the three-way valve 74 is switched to close the inlet of the bypass conduit 78), the first refrigerant having passed through the first passage 71 of the water-cooled heat exchanger 70 may not pass through the bypass conduit 78, and may be directed into the evaporator 27 and/or the refrigerant chiller 52.

During a heating operation of the HVAC subsystem 11, the water-cooled heat exchanger 70 may be configured to evaporate the refrigerant received from the interior condenser 24 using the heat received from the battery cooling subsystem 12 and the powertrain cooling subsystem 13. That is, during the heating operation of the HVAC subsystem 11, the water-cooled heat exchanger 70 may serve as an evaporator that evaporates the first refrigerant by recovering waste heat from the battery cooling subsystem 12 and the powertrain component 42 of the powertrain cooling subsystem 13.

During a cooling operation of the HVAC subsystem 11, the water-cooled heat exchanger 70 may be configured to condense the refrigerant received from the interior condenser 24. The water-cooled heat exchanger 70 may serve as a condenser that condenses the first refrigerant by cooling the first refrigerant using the battery-side coolant circulating in the battery coolant loop 31 and the powertrain-side coolant circulating in the powertrain coolant loop 41.

The heating-side expansion valve 54 may be located on the upstream side of the water-cooled heat exchanger 70 in the first refrigerant loop 22. Specifically, the heating-side expansion valve 54 may be disposed between the interior condenser 24 and the water-cooled heat exchanger 70. During the heating operation of the HVAC subsystem 11, the heating-side expansion valve 54 may adjust the flow of the refrigerant or the flow rate of the refrigerant into the first passage 71 of the water-cooled heat exchanger 70. The heating-side expansion valve 54 may be configured to expand the refrigerant received from the interior condenser 24 during the heating operation of the HVAC subsystem 11.

According to an exemplary embodiment, the heating-side expansion valve 54 may be an electronic expansion valve (EXV) having a drive motor 54a. The drive motor 54a may have a shaft which is movable to open or close an orifice defined in a valve body of the heating-side expansion valve 54, and the position of the shaft may be varied depending on the rotation direction, rotation degree, and the like of the drive motor 54a, and thus the opening degree of the orifice of the heating-side expansion valve 54 may be varied. A controller 100 may control the operation of the drive motor 54a. The heating-side expansion valve 54 may be a full open type EXV. When the HVAC subsystem 11 operates in a cooling mode, the heating-side expansion valve 54 may be fully opened. As the heating-side expansion valve 54 is fully opened (the opening degree of the heating-side expansion valve 54 is 100%), the first refrigerant may not be expanded (throttled) by the heating-side expansion valve 54. The opening degree of the heating-side expansion valve 54 may be varied by the controller 100. As the opening degree of the heating-side expansion valve 54 is varied, the flow rate of the first refrigerant into the first passage 71 may be varied. The heating-side expansion valve 54 may be controlled by the controller 100 during the heating operation of the HVAC subsystem 11.

The first refrigerant passing through the interior condenser 24 may be cooled and condensed by the air passing through the HVAC casing. Since a temperature difference between the first refrigerant and the air is relatively low, condensation efficiency of the first refrigerant obtained by the interior condenser 24 may be insignificant. The first refrigerant passing through the first passage 71 of the water-cooled heat exchanger 70 may be cooled and condensed by the battery-side coolant and the powertrain-side coolant. Most of the first refrigerant may be condensed by the water-cooled heat exchanger 70.

The cooling-side expansion valve 26 may be located on the upstream side of the evaporator 27 in the first refrigerant loop 22. During the cooling operation of the HVAC subsystem 11, the cooling-side expansion valve 26 may be configured to adjust the flow of the refrigerant or the flow rate of the refrigerant into the evaporator 27, and expand the refrigerant received from the first passage 71 of the water-cooled heat exchanger 70.

According to an exemplary embodiment, the cooling-side expansion valve 26 may be a thermal expansion valve (TXV) which senses the temperature and/or pressure of the refrigerant and adjusts the opening degree of the cooling-side expansion valve 26. Specifically, the cooling-side expansion valve 26 may be a TXV having a shut-off valve 26a selectively blocking the flow of the refrigerant toward an internal passage of the cooling-side expansion valve 26, and the shut-off valve 26a may be a solenoid valve. The shut-off valve 26a may be opened or closed by the controller 100, thereby blocking or unblocking the flow of the refrigerant toward the cooling-side expansion valve 26.

When the shut-off valve 26a is opened, the refrigerant may be allowed to flow into the cooling-side expansion valve 26, and when the shut-off valve 26a is closed, the refrigerant may be blocked from flowing into the cooling-side expansion valve 26. According to an exemplary embodiment, the shut-off valve 26a may be mounted in the inside of a valve body of the cooling-side expansion valve 26, thereby opening or closing the internal passage of the cooling-side expansion valve 26. According to another exemplary embodiment, the shut-off valve 26a may be located on the upstream side of the cooling-side expansion valve 26, thereby selectively opening or closing an inlet of the cooling-side expansion valve 26.

When the shut-off valve 26a is closed, the flow of the first refrigerant to the cooling-side expansion valve 26 may be blocked, and accordingly the first refrigerant may only be directed into the refrigerant chiller 52 to be described below without flowing into the cooling-side expansion valve 26 and the evaporator 27. That is, when the shut-off valve 26a is closed, the cooling operation of the HVAC subsystem 11 may not be performed. When the shut-off valve 26a is opened, the first refrigerant may be directed into the cooling-side expansion valve 26 and the evaporator 27. That is, when the shut-off valve 26a is opened, the cooling operation of the HVAC subsystem 11 may be performed.

The evaporator 27 may be located on the upstream side of the first compressor 23. The evaporator 27 may receive the first refrigerant expanded by the cooling-side expansion valve 26. The air may pass over an exterior surface of the evaporator 27, and the first refrigerant may pass through an internal passage of the evaporator 27 so that the evaporator 27 may be configured to cool the air using the first refrigerant received from the cooling-side expansion valve 26. The HVAC casing may be configured to blow the air into a passenger compartment of the vehicle, and the interior condenser 24 and the evaporator 27 may be disposed inside the HVAC casing.

When the HVAC subsystem 11 operates in the cooling mode, the shut-off valve 26a of the cooling-side expansion valve 26 may be opened, and the refrigerant may sequentially circulate through the first compressor 23, the interior condenser 24, the first passage 71 of the water-cooled heat exchanger 70, the cooling-side expansion valve 26, and the evaporator 27.

When the HVAC subsystem 11 operates in a heating mode, the shut-off valve 26a of the cooling-side expansion valve 26 may be closed, and the inlet of the bypass conduit 78 may be opened by the switching of the three-way valve 74, and accordingly the refrigerant may sequentially circulate through the first compressor 23, the interior condenser 24, the heating-side expansion valve 54, the first passage 71 of the water-cooled heat exchanger 70, and the bypass conduit 78.

The battery cooling subsystem 12 may include the battery coolant loop 31 through which the battery-side coolant circulates. The battery coolant loop 31 may be fluidly connected to the battery 32, a battery chiller 33, the second passage 72 of the water-cooled heat exchanger 70, a battery radiator 36, a first battery-side pump 34, and a second battery-side pump 35.

The battery 32 may have a coolant passage provided inside or outside thereof, and the battery-side coolant may pass through the coolant passage. The battery coolant loop 31 may be fluidly connected to the coolant passage of the battery 32.

The battery chiller 33 may be located on the downstream side of the battery 32 in the battery coolant loop 31, and the battery chiller 33 may be configured to cool the battery-side coolant received from the coolant passage of the battery 32 using a second refrigerant circulating in a second refrigeration cycle 14 to be described below, and accordingly the second refrigerant may be heated and evaporated by the battery-side coolant in the battery chiller 33. In particular, a first passage 33a of the battery chiller 33 may be located on the upstream side of the second passage 72 of the water-cooled heat exchanger 70 in the battery coolant loop 31.

The battery radiator 36 may be adjacent to a front grille of the vehicle, and the battery-side coolant passing through the battery radiator 36 may exchange heat with the ambient air. In particular, the battery radiator 36 may exchange heat with the ambient air forcibly blown by a cooling fan 46 so that a heat transfer rate between the battery radiator 36 and the ambient air may be further increased.

The battery radiator 36, a powertrain radiator 44, and an exterior heat exchanger 25 may be disposed adjacent to each other on the front of the vehicle, thereby forming a cooling module on the front of the vehicle. The cooling fan 46 may be disposed behind the exterior heat exchanger 25, the battery radiator 36, and the powertrain radiator 44.

The first battery-side pump 34 and the second battery-side pump 35 may be disposed between the battery radiator 36 and the battery 32 in the battery coolant loop 31, and the first battery-side pump 34 and the second battery-side pump 35 may be electric pumps causing the battery-side coolant to circulate. Compared to the second battery-side pump 35, the first battery-side pump 34 may be adjacent to the battery 32. Compared to the first battery-side pump 34, the second battery-side pump 35 may be adjacent to the battery radiator 36.

The battery cooling subsystem 12 may include a battery reservoir 76a located on the downstream side of the battery radiator 36. The battery reservoir 76a may be located between the battery radiator 36 and the second battery-side pump 35. The battery reservoir 76a may be configured to temporarily store and replenish the battery-side coolant so that the flow rate of the battery-side coolant circulating in the battery coolant loop 31 may be kept constant.

The battery cooling subsystem 12 may further include a first battery bypass conduit 37a allowing the battery-side coolant to bypass the battery radiator 36, and a second battery bypass conduit 37b allowing the battery-side coolant to bypass the battery 32 and the battery chiller 33. Compared to the second battery bypass conduit 37b, the first battery bypass conduit 37a may be adjacent to the battery 32. Compared to the first battery bypass conduit 37a, the second battery bypass conduit 37b may be adjacent to the battery radiator 36. The first battery bypass conduit 37a and the second battery bypass conduit 37b may connect an upstream point of the battery 32 and a downstream point of the battery chiller 33 in the battery coolant loop 31. One end of the first battery bypass conduit 37a may be connected to a point between the upstream point of the battery 32 and an outlet of the battery radiator 36 in the battery coolant loop 31. The other end of the first battery bypass conduit 37a may be connected to a point between the downstream point of the battery chiller 33 and an inlet of the battery radiator 36 in the battery coolant loop 31. One end of the second battery bypass conduit 37b may be connected to a point between the outlet of the battery radiator 36 and one end of the first battery bypass conduit 37a in the battery coolant loop 31. The other end of the second battery bypass conduit 37b may be connected to a point between the inlet of the battery radiator 36 and the other end of the first battery bypass conduit 37a in the battery coolant loop 31.

The battery cooling subsystem 12 may include a first three-way valve 38 and a second three-way valve 39 adjusting the flow direction of the battery-side coolant.

The first three-way valve 38 may be disposed on one end of the first battery bypass conduit 37a. Specifically, the first three-way valve 38 may be disposed at a junction between one end of the first battery bypass conduit 37a and the battery coolant loop 31. The first three-way valve 38 may include a first port 38a fluidly connected to the first battery-side pump 34, a second port 38b fluidly connected to the second battery-side pump 35, and a third port 38c fluidly connected to the first battery bypass conduit 37a. The first three-way valve 38 may be switched to allow at least two of the first port 38a, the second port 38b, and the third port 38c to selectively communicate with each other, or to close all of the first port 38a, the second port 38b, and the third port 38c.

The second three-way valve 39 may be disposed on the other end of the second battery bypass conduit 37b. Specifically, the second three-way valve 39 may be disposed at a junction between the other end of the second battery bypass conduit 37b and the battery coolant loop 31. The second three-way valve 39 may include a first port 39a fluidly connected to the battery radiator 36, a second port 39b fluidly connected to the battery chiller 33, and a third port 39c fluidly connected to the second battery bypass conduit 37b. The second three-way valve 39 may be switched to allow at least two of the first port 39a, the second port 39b, and the third port 39c to selectively communicate with each other, or to close all of the first port 39a, the second port 39b, and the third port 39c.

The first three-way valve 38 and the second three-way valve 39 may be configured to adjust the flow of the battery-side coolant in the battery coolant loop 31. The first battery-side pump 34 and the second battery-side pump 35 may selectively operate according to the switching operation of the first three-way valve 38 and the switching operation of the second three-way valve 39.

The vehicle thermal management system according to an exemplary embodiment of the present disclosure may further include the second refrigeration cycle 14 thermally connected to the first refrigeration cycle 21. The second refrigeration cycle 14 may include a second refrigerant loop 61 through which the second refrigerant circulates. The second refrigerant loop 61 may be fluidly connected to a second compressor 62, the exterior heat exchanger 25, the refrigerant chiller 52, and the battery chiller 33. The second refrigerant may sequentially pass through the second compressor 62, the exterior heat exchanger 25, the refrigerant chiller 52, and the battery chiller 33 in the second refrigerant loop 61.

The second compressor 62 may be configured to compress the second refrigerant. According to an exemplary embodiment, the second compressor 62 may be an electric compressor which is driven using electric energy.

The exterior heat exchanger 25 may be located on the downstream side of the second compressor 62. The exterior heat exchanger 25 may be disposed outside the HVAC casing, and the exterior heat exchanger 25 may be adjacent to the front grille of the vehicle. Since the exterior heat exchanger 25 is exposed to the outside, heat may be transferred between the exterior heat exchanger 25 and the ambient air. An active air flap (not shown) may be provided to open and close the front grille of the vehicle. In particular, the exterior heat exchanger 25 may exchange heat with the ambient air forcibly blown by the cooling fan 46 so that a heat transfer rate between the exterior heat exchanger 25 and the ambient air may be further increased.

The first refrigeration cycle 21 of the HVAC subsystem 11 may further include a branch conduit 51 branching off from the first refrigerant loop 22. The branch conduit 51 may branch off from an upstream point of the shut-off valve 26a, and be connected to a point between the evaporator 27 and the first compressor 23. In particular, the branch conduit 51 may be connected to an upstream point of the first compressor 23. That is, the branch conduit 51 may directly connect the upstream point of the shut-off valve 26a and the upstream point of the first compressor 23, and accordingly the first refrigerant passing through the branch conduit 51 may not flow into the cooling-side expansion valve 26 and the evaporator 27. The refrigerant chiller 52 and the first chiller-side expansion valve 53 may be disposed in the branch conduit 51, and the first chiller-side expansion valve 53 may be located on the upstream side of the refrigerant chiller 52. A portion of the first refrigerant may be directed into the evaporator 27 through the cooling-side expansion valve 26, and a remaining portion of the first refrigerant may be directed into the refrigerant chiller 52 through the first chiller-side expansion valve 53.

The refrigerant chiller 52 may thermally connect the first refrigeration cycle 21 and the second refrigeration cycle 14. Specifically, the refrigerant chiller 52 may be configured to transfer heat between the first refrigerant circulating in the first refrigeration cycle 21 and the second refrigerant circulating in the second refrigeration cycle 14. The refrigerant chiller 52 and the evaporator 27 may be connected in parallel between the exterior heat exchanger 25 and the first compressor 23, and accordingly the first refrigerant may be selectively distributed to the evaporator 27 and the refrigerant chiller 52 through the shut-off valve 26a of the cooling-side expansion valve 26 and a drive motor 53a of the first chiller-side expansion valve 53. Specifically, the refrigerant chiller 52 may be configured to transfer heat between the branch conduit 51 of the first refrigeration cycle 21 and the second refrigerant loop 61 of the second refrigeration cycle 14. In particular, the refrigerant chiller 52 may be configured to transfer heat between the first refrigerant circulating in the branch conduit 51 and the second refrigerant circulating in the second refrigerant loop 61 of the second refrigeration cycle 14. The refrigerant chiller 52 may include a first passage 52a fluidly connected to the branch conduit 51, and a second passage 52b fluidly connected to the second refrigerant loop 61. The first passage 52a may be located between an outlet of the first chiller-side expansion valve 53 and an inlet of the first compressor 23. The second passage 52b may be located on the upstream side of the battery chiller 33 in the second refrigerant loop 61. The first passage 52a and the second passage 52b may be adjacent to or contact each other within the refrigerant chiller 52 so that the first passage 52a may be thermally connected to the second passage 52b, and the first passage 52a may be fluidly separated from the second passage 52b. Accordingly, the refrigerant chiller 52 may transfer heat between the first refrigerant passing through the first passage 52a and the second refrigerant passing through the second passage 52b. Since the temperature of the second refrigerant passing through the second passage 52b is higher than the temperature of the first refrigerant passing through the first passage sea, the heat may be transferred from the second refrigerant passing through the second passage 52b to the first refrigerant passing through the first passage sea, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The first passage 52a of the refrigerant chiller 52 may serve as an evaporator in the first refrigeration cycle 21, and the second passage 52b of the refrigerant chiller 52 may serve as a condenser in the second refrigeration cycle 14. Thus, the refrigerant chiller 52 may be an integrated structure of the evaporator for evaporating the first refrigerant and the condenser for condensing the second refrigerant.

The second refrigeration cycle 14 may further include a condenser 63 thermally connected to the battery cooling subsystem 12. The condenser 63 may be located on the downstream side of the second compressor 62 in the second refrigerant loop 61, and the condenser 63 may be configured to condense the second refrigerant received from the second compressor 62. In the condenser 63, the second refrigerant may be cooled and condensed by exchanging heat with the battery-side coolant circulating in the battery cooling subsystem 12. In particular, the condenser 63 may be configured to transfer heat between the battery-side coolant cooled by the battery radiator 36 or the battery chiller 33 and the second refrigerant received from the second compressor 62, and accordingly the second refrigerant may be cooled and condensed by the battery-side coolant in the condenser 63, and the battery-side coolant may be heated by the second refrigerant in the condenser 63. The condenser 63 may include a first passage 63a fluidly connected to the battery coolant loop 31 of the battery cooling subsystem 12, and a second passage 63b fluidly connected to the second refrigerant loop 61 of the second refrigeration cycle 14. Referring to FIG. 1, the first passage 63a of the condenser 63 may be located on the upstream side of the second passage 72 of the water-cooled heat exchanger 70 in the battery coolant loop 31. Specifically, the second passage 72 of the water-cooled heat exchanger 70 may be located between the inlet of the battery radiator 36 and the other end of the second battery bypass conduit 37b.

According to an exemplary embodiment, the first passage 63a of the condenser 63 may be fluidly connected to the second battery bypass conduit 37b, and the first passage 63a of the condenser 63 may be located on the upstream side of the second passage 72 of the water-cooled heat exchanger 70. The battery-side coolant passing through the first passage 63a may exchange heat with the second refrigerant passing through the second passage 63b, and accordingly the second refrigerant may be cooled and condensed by the battery-side coolant, and the battery-side coolant may be heated by the second refrigerant.

The exterior heat exchanger 25 may be located on the downstream side of the condenser 63 in the second refrigerant loop 61. The second refrigerant compressed by the second compressor 62 may be primarily condensed by the condenser 63, and be secondarily condensed by the refrigerant chiller 52, and thus the cooling efficiency and condensation efficiency of the second refrigerant may be improved.

According to an exemplary embodiment, the second refrigeration cycle 14 may include a chiller-side bypass conduit 80 allowing the second refrigerant to bypass a second passage 33b of the battery chiller 33, and a chiller-side three-way valve 82 controlling the flow of the second refrigerant.

An inlet of the chiller-side bypass conduit 80 may be connected to the upstream side of the second passage 33b of the battery chiller 33 in the second refrigerant loop 61, and an outlet of the chiller-side bypass conduit 80 may be connected to the downstream side of the second passage 33b of the battery chiller 33 in the second refrigerant loop 61.

The chiller-side three-way valve 82 may be disposed at a junction between the inlet of the chiller-side bypass conduit 80 and the second refrigerant loop 61, and the chiller-side three-way valve 82 may be configured to control the flow of the second refrigerant between the inlet of the chiller-side bypass conduit 80 and the second refrigerant loop 61. The chiller-side three-way valve 82 may include a first port 82a fluidly connected to the second passage 52b of the refrigerant chiller 52, a second port 82b fluidly connected to a second chiller-side expansion valve 85, and a third port 82c fluidly connected to the chiller-side bypass conduit 80. The chiller-side three-way valve 82 may be switched to allow at least two of the first port 82a, the second port 82b, and the third port 82c to selectively communicate with each other.

The second refrigeration cycle 14 may further include an auxiliary expansion valve 75 disposed between the condenser 63 and the exterior heat exchanger 25 in the second refrigerant loop 61.

According to an exemplary embodiment, the auxiliary expansion valve 75 may be an EXV having a drive motor 75a. The drive motor 75a may have a shaft which is movable to open or close an orifice defined in a valve body of the auxiliary expansion valve 75, and the position of the shaft may be varied depending on the rotation direction, rotation degree, and the like of the drive motor 75a, and thus the opening degree of the orifice of the auxiliary expansion valve 75 may be varied. The controller 100 may control the operation of the drive motor 75a. The auxiliary expansion valve 75 may be a full open type EXV.

The opening degree of the auxiliary expansion valve 75 may be varied by the controller 100. As the opening degree of the auxiliary expansion valve 75 is varied, the flow rate of the second refrigerant into the exterior heat exchanger 25 may be varied. When the temperature of the battery 32 increases, the opening degree of the auxiliary expansion valve 75 may be varied to adjust the flow of the refrigerant or the flow rate of the refrigerant into the exterior heat exchanger 25, and accordingly the auxiliary expansion valve 75 may be configured to expand the refrigerant received from the condenser 63. During the cooling of the battery 32, the auxiliary expansion valve 75 may be fully opened. As the auxiliary expansion valve 75 is fully opened (the opening degree of the auxiliary expansion valve 75 is 100%), the second refrigerant may not be expanded (throttled) by the auxiliary expansion valve 75.

During the cooling of the battery 32, the exterior heat exchanger 25 may be configured to condense the second refrigerant received from the condenser 63. That is, during the cooling of the battery 32, the exterior heat exchanger 25 may serve as a condenser that condenses the second refrigerant by transferring heat to the ambient air.

When the temperature of the battery 32 increases, the exterior heat exchanger 25 may be configured to evaporate the second refrigerant received from the condenser 63. That is, when the temperature of the battery 32 increases, the exterior heat exchanger 25 may serve as an evaporator that evaporates the second refrigerant by absorbing heat from the ambient air. When it is required to increase the temperature of the battery 32, the second refrigerant may bypass the second passage 33b of the battery chiller 33 so that the battery-side coolant may not be cooled by the battery chiller 33.

The powertrain cooling subsystem 13 may include the powertrain coolant loop 41 through which the powertrain-side coolant circulates. The powertrain coolant loop 41 may be fluidly connected to the powertrain component 42, the powertrain radiator 44, and a powertrain-side pump 45. In FIG. 1, the powertrain-side coolant may sequentially pass through the powertrain component 42, the third passage 73 of the water-cooled heat exchanger 70, the powertrain radiator 44, and the powertrain-side pump 45 in the powertrain coolant loop 41.

The powertrain component 42 may be at least one of an electric motor, an inverter, an on-board charger (OBC), and a low DC-DC converter (LDC) constituting an electric powertrain system of an electric vehicle. The powertrain component 42 may have a coolant passage provided inside or outside thereof, and the powertrain-side coolant may pass through the coolant passage. The powertrain coolant loop 41 may be fluidly connected to the coolant passage of the powertrain component 42. In particular, the powertrain component 42 may be located on the upstream side of the third passage 73 of the water-cooled heat exchanger 70 in the powertrain coolant loop 41, and the third passage 73 of the water-cooled heat exchanger 70 may be located between an inlet of the powertrain radiator 44 and the powertrain component 42 in the powertrain coolant loop 41.

The powertrain radiator 44 may be adjacent to the front grille of the vehicle, and the powertrain-side coolant passing through the powertrain radiator 44 may exchange heat with the ambient air. In particular, the powertrain radiator 44 may exchange heat with the ambient air forcibly blown by the cooling fan 46 so that a heat transfer rate between the powertrain radiator 44 and the ambient air may be further increased.

The powertrain-side pump 45 may be located on the upstream side of the powertrain component 42, and the powertrain-side pump 45 may be an electric pump causing the powertrain-side coolant to circulate in the powertrain coolant loop 41. The operation of the powertrain-side pump 45 may be controlled by the controller 100.

The powertrain cooling subsystem 13 may further include a powertrain reservoir 76b located on a downstream point of the powertrain radiator 44. The powertrain reservoir 76b may be located between an outlet of the powertrain radiator 44 and the powertrain-side pump 45. The powertrain reservoir 76b may be configured to temporarily store and replenish the powertrain-side coolant so that the flow rate of the powertrain-side coolant circulating in the powertrain coolant loop 41 may be kept constant.

The powertrain cooling subsystem 13 may further include a powertrain bypass conduit 47 allowing the powertrain-side coolant to bypass the powertrain radiator 44. The powertrain bypass conduit 47 may directly connect an upstream point of the powertrain radiator 44 and the downstream point of the powertrain radiator 44 in the powertrain coolant loop 41. One end of the powertrain bypass conduit 47 may be connected to a point between the powertrain component 42 and the outlet of the powertrain radiator 44 in the powertrain coolant loop 41. Specifically, one end of the powertrain bypass conduit 47 may be connected to a point between the outlet of the powertrain radiator 44 and an inlet of the powertrain-side pump 45 in the powertrain coolant loop 41. The other end of the powertrain bypass conduit 47 may be connected to a point between the powertrain component 42 and the inlet of the powertrain radiator 44 in the powertrain coolant loop 41.

The powertrain cooling subsystem 13 may further include a three-way valve 48 disposed at one end of the powertrain bypass conduit 47. That is, the three-way valve 48 may be disposed at a junction between one end of the powertrain bypass conduit 47 and the powertrain coolant loop 41. The three-way valve 48 may include a first port 48a fluidly connected to the powertrain-side pump 45, a second port 48b fluidly connected to the powertrain radiator 44, and a third port 48c fluidly connected to the powertrain bypass conduit 47. The three-way valve 48 may be switched to allow at least two of the first port 48a, the second poll 48b, and the third port 48c to selectively communicate with each other, or to close all of the first port 48a, the second port 48b, and the third port 48c. For example, when the three-way valve 48 is switched to allow the second port 48b to communicate with the first port 48a (that is, the three-way valve 48 is switched to close one end of the powertrain bypass conduit 47), the powertrain-side coolant may not pass through the powertrain bypass conduit 47, and may sequentially flow through the powertrain component 42, the third passage 73 of the water-cooled heat exchanger 70, and the powertrain radiator 44. When the three-way valve 48 is switched to allow the third poll 48c to communicate with the first poll 48a (that is, the three-way valve 39 is switched to open one end of the powertrain bypass conduit 47), the powertrain-side coolant may pass through the powertrain bypass conduit 47 so that it may sequentially flow through the powertrain-side pump 45, the powertrain component 42, and the third passage 73 of the water-cooled heat exchanger 70. When the three-way valve 48 is switched to close all of the first port 48a, the second port 48b, and the third port 48c, the powertrain-side coolant may not circulate through the powertrain coolant loop 41. As described above, the three-way valve 48 may be configured to adjust the flow of the powertrain-side coolant in the powertrain coolant loop 41.

According to an exemplary embodiment, the battery reservoir 76a and the powertrain reservoir 76b may be joined to form an integrated reservoir 76, and the battery reservoir 76a and the powertrain reservoir 76b may be fluidly separated from each other by a partition and/or the like.

According to another exemplary embodiment, the battery reservoir 76a and the powertrain reservoir 76b may be fluidly connected to each other in the integrated reservoir 76, and accordingly the battery-side coolant and the powertrain-side coolant may be mixed in the integrated reservoir 76.

The battery chiller 33 may be configured to transfer heat between the second refrigerant circulating in the second refrigeration cycle 14 and the battery-side coolant circulating in the battery cooling subsystem 12. Specifically, the battery chiller 33 may transfer heat between the second refrigerant loop 61 of the second refrigeration cycle 14 and the battery coolant loop 31 of the battery cooling subsystem 12. The battery chiller 33 may transfer heat between the second refrigerant circulating in the second refrigerant loop 61 of the second refrigeration cycle 14 and the battery-side coolant passing through the battery coolant loop 31, thereby evaporating the second refrigerant cooled and condensed by the refrigerant chiller 52, and thus cooling the battery-side coolant. The battery chiller 33 may include the first passage 33a fluidly connected to the battery coolant loop 31, and the second passage 33b fluidly connected to the second refrigerant loop 61 of the second refrigeration cycle 14. The first passage 33a may be located on a downstream point of the battery 32 in the battery coolant loop 31, and the second passage 33b may be located on a downstream point of the refrigerant chiller 52 in the second refrigerant loop 61. The first passage 33a and the second passage 33b may be adjacent to or contact each other within the battery chiller 33 so that the first passage 33a may be thermally connected to the second passage 33b, and the first passage 33a may be fluidly separated from the second passage 33b. Accordingly, the battery chiller 33 may transfer heat between the battery-side coolant passing through the first passage 33a and the second refrigerant passing through the second passage 33b.

The second passage 33b of the battery chiller 33 may be located on the downstream side of the second passage 52b of the refrigerant chiller 52 in the second refrigerant loop 61, and accordingly the second passage 33b of the battery chiller 33 may receive the second refrigerant from the second passage 52b of the refrigerant chiller 52. Since the temperature of the second refrigerant passing through the second passage 33b is lower than the temperature of the battery-side coolant passing through the first passage 33a, the battery-side coolant may be cooled by the battery chiller 33. The battery-side coolant cooled by the battery chiller 33 may be directed into the coolant passage of the battery 32 by the first battery-side pump 34 so that the battery 32 may be cooled.

The second chiller-side expansion valve 85 may be located on the upstream side of the second passage 33b of the battery chiller 33 in the second refrigerant loop 61. Specifically, the second chiller-side expansion valve 85 may be located between the second passage 52b of the refrigerant chiller 52 and the second passage 33b of the battery chiller 33 in the second refrigerant loop 61. The second chiller-side expansion valve 85 may adjust the flow of the second refrigerant or the flow rate of the second refrigerant into the second passage 33b of the battery chiller 33, and the second chiller-side expansion valve 85 may be configured to expand the refrigerant received from the refrigerant chiller 52.

According to an exemplary embodiment, the second chiller-side expansion valve 85 may have a drive motor 85a, and the drive motor 85a may have a shaft which is movable to open or close an internal passage defined in a valve body of the second chiller-side expansion valve 85. The position of the shaft may be varied depending on the rotation direction, rotation degree, and the like of the drive motor 85a, and thus the opening degree of the internal passage of the second chiller-side expansion valve 85 may be varied. The controller 100 may control the operation of the drive motor 85a.

According to another exemplary embodiment, the second chiller-side expansion valve 85 may be a TXV. When only the cooling operation of the battery 32 is performed, the second chiller-side expansion valve 85 may adjust the flow rate of the second refrigerant into the second passage 33b of the battery chiller 33 and adjust the superheat degree of the second refrigerant flowing out from the second passage 33b of the battery chiller 33 to a predetermined value.

According to an exemplary embodiment, the second chiller-side expansion valve 85 may be integrally formed with the chiller-side three-way valve 82.

The first refrigerant may cool the second refrigerant in the refrigerant chiller 52, the cooled second refrigerant may cool the battery-side coolant in the battery chiller 33, and the cooled battery-side coolant may cool the battery 32. As described above, the second refrigeration cycle 14 may be thermally connected to the first refrigeration cycle 21 of the HVAC subsystem 11 through the refrigerant chiller 52 and be thermally connected to the battery cooling subsystem 12 through the battery chiller 33, and thus the first refrigeration cycle 21, the second refrigeration cycle 14, and the battery cooling subsystem 12 may form a cascade refrigeration cycle.

The overall operations of the HVAC subsystem 11, the battery cooling subsystem 12, the powertrain cooling subsystem 13, and the second refrigeration cycle 14 may be controlled by the controller 100. For example, the controller 100 may control the operations of the shut-off valve 26a of the cooling-side expansion valve 26, the first compressor 23, the cooling fan 46, the drive motor 53a of the first chiller-side expansion valve 53, the drive motor 54a of the heating-side expansion valve 54, the drive motor 85a of the second chiller-side expansion valve 85, the second compressor 62, the first battery-side pump 34, the second battery-side pump 35, the powertrain-side pump 45, and the three-way valves 39, 48, and 74, so that the cooling and heating of the passenger compartment, the cooling of the battery 32, and the cooling of the powertrain component 42 may be performed appropriately. According to an exemplary embodiment, the controller 100 may be a full automatic temperature control (FATC) system.

The battery cooling subsystem 12 may be controlled by a battery management system 110. The battery management system 110 may monitor the state of the battery 32, and perform the cooling of the battery 32 when the temperature of the battery 32 is higher than or equal to a predetermined temperature. The battery management system 110 may transmit an instruction for the cooling of the battery 32 to the controller 100, and accordingly the controller 100 may control the operation of the second compressor 62 and the opening degrees of the expansion valves 53 and 85.

According to an exemplary embodiment, the first refrigerant and the second refrigerant may be different refrigerants. For example, the first refrigerant may be R1234yf (hydrofluoroolefin (HFO) refrigerant), and the second refrigerant may be a natural refrigerant such as R290. Thus, efficiency of the first refrigeration cycle 21 and efficiency of the second refrigeration cycle 14 may be improved independently.

According to another exemplary embodiment, the first refrigerant may be the same as the second refrigerant.

Since the vehicle thermal management system according to an exemplary embodiment of the present disclosure includes two compressors 23 and 62, a capacity of each of the compressors 23 and 62 may be significantly less than that of a compressor in a thermal management system according to the related art. For example, while the capacity of the compressor in the thermal management system according to the related art is 45cc, the capacity of the first compressor 23 and the capacity of the second compressor 62 may be reduced to 30cc or less. In addition, as the two compressors 23 and 62 are used, the compression efficiency of each refrigerant may be improved. In particular, as the capacity of the first compressor 23 decreases, the capacity of the evaporator 27 may decrease.

According to an exemplary embodiment, the capacity of the first compressor 23 may be different from the capacity of the second compressor 62. In particular, the first compressor 23 may be configured to compress the first refrigerant received from the refrigerant chiller 52 and the evaporator 27, and the second compressor 62 may be configured to compress the second refrigerant received from the battery chiller 33. Accordingly, the capacity of the first compressor 23 may be greater than the capacity of the second compressor 62. For example, the capacity of the first compressor 23 may be 27cc, and the capacity of the second compressor 62 may be 20cc.

According to another exemplary embodiment, the capacity of the first compressor 23 may be the same as the capacity of the second compressor 62.

Figure 2:
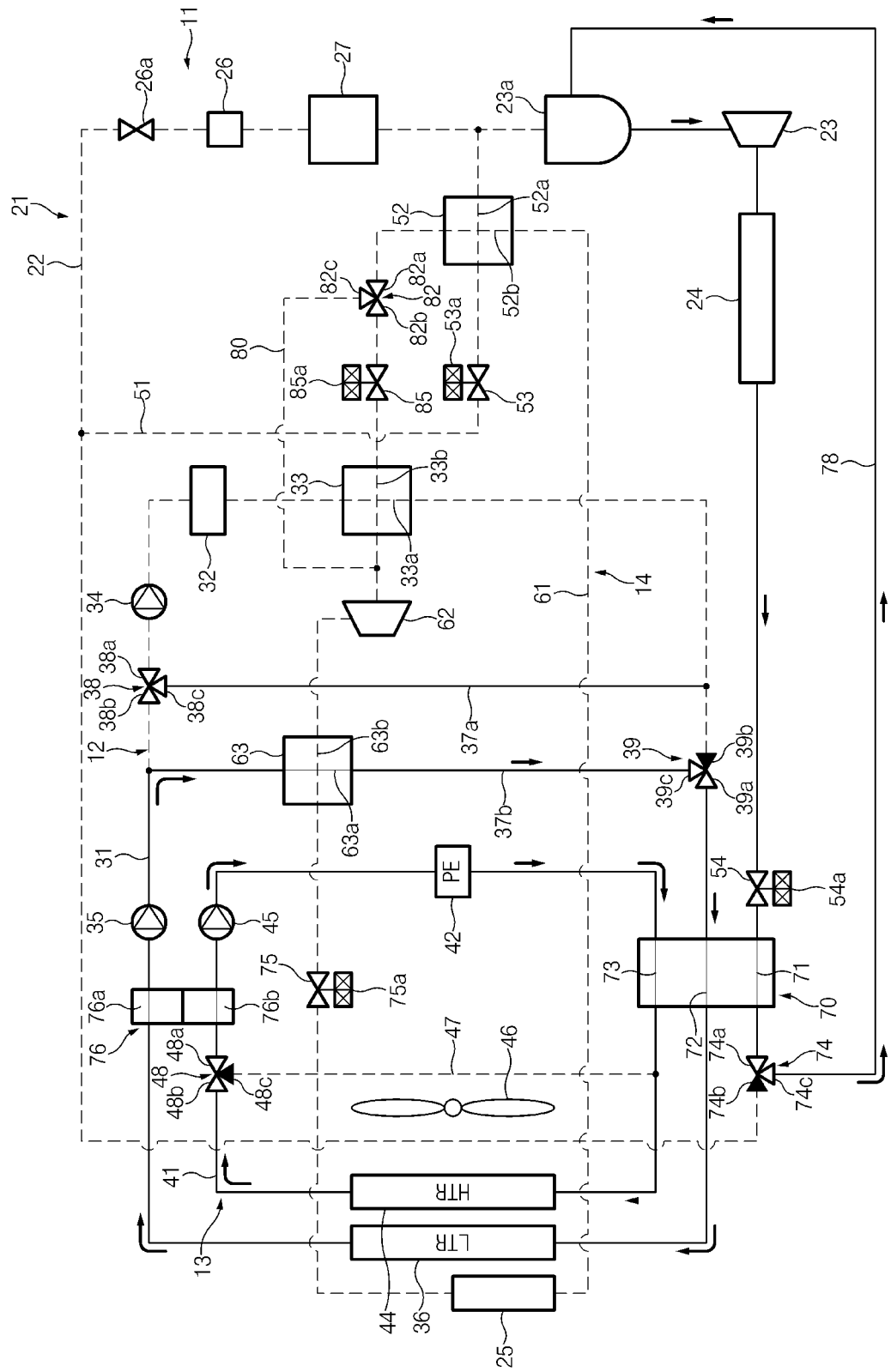
FIG. 2 illustrates a process in which a heating, ventilation, and air conditioning (HVAC) subsystem operates in a heating mode in the vehicle thermal management system illustrated in FIG. 1.

FIG. 2 shows that the HVAC subsystem 11 operates in a heating mode. Referring to FIG. 2, the first compressor 23 of the first refrigeration cycle 21 may operate, and the second compressor 62 of the second refrigeration cycle 14 may stop. The second battery-side pump 35 of the battery cooling subsystem 12 and the powertrain-side pump 45 of the powertrain cooling subsystem 13 may operate. The second three-way valve 39 of the battery cooling subsystem 12 may be switched to allow the first port 39a to communicate with the third port 39c, and accordingly the battery-side coolant may sequentially pass through the second passage 72 of the water-cooled heat exchanger 70 and the battery radiator 36 by the second battery-side pump 35. The three-way valve 74 of the first refrigeration cycle 21 may be switched to allow the third port 74c to communicate with the first port 74a, and the second port 74b of the three-way valve 74 may be closed, and accordingly the first refrigerant may sequentially pass through the first compressor 23, the interior condenser 24, the heating-side expansion valve 54, the first passage 71 of the water-cooled heat exchanger 70, and the bypass conduit 78. As the heating-side expansion valve 54 is opened to a predetermined opening degree, the first refrigerant may be expanded by the heating-side expansion valve 54. As the first refrigerant passing through the first passage 71 of the water-cooled heat exchanger 70 exchanges heat with the battery-side coolant passing through the second passage 72 of the water-cooled heat exchanger 70 and the powertrain-side coolant passing through the third passage 73 of the water-cooled heat exchanger 70, the first refrigerant may be evaporated. As described above, as the HVAC subsystem 11 operates in the heating mode, the heating of the passenger compartment may be performed.

Figure 3:
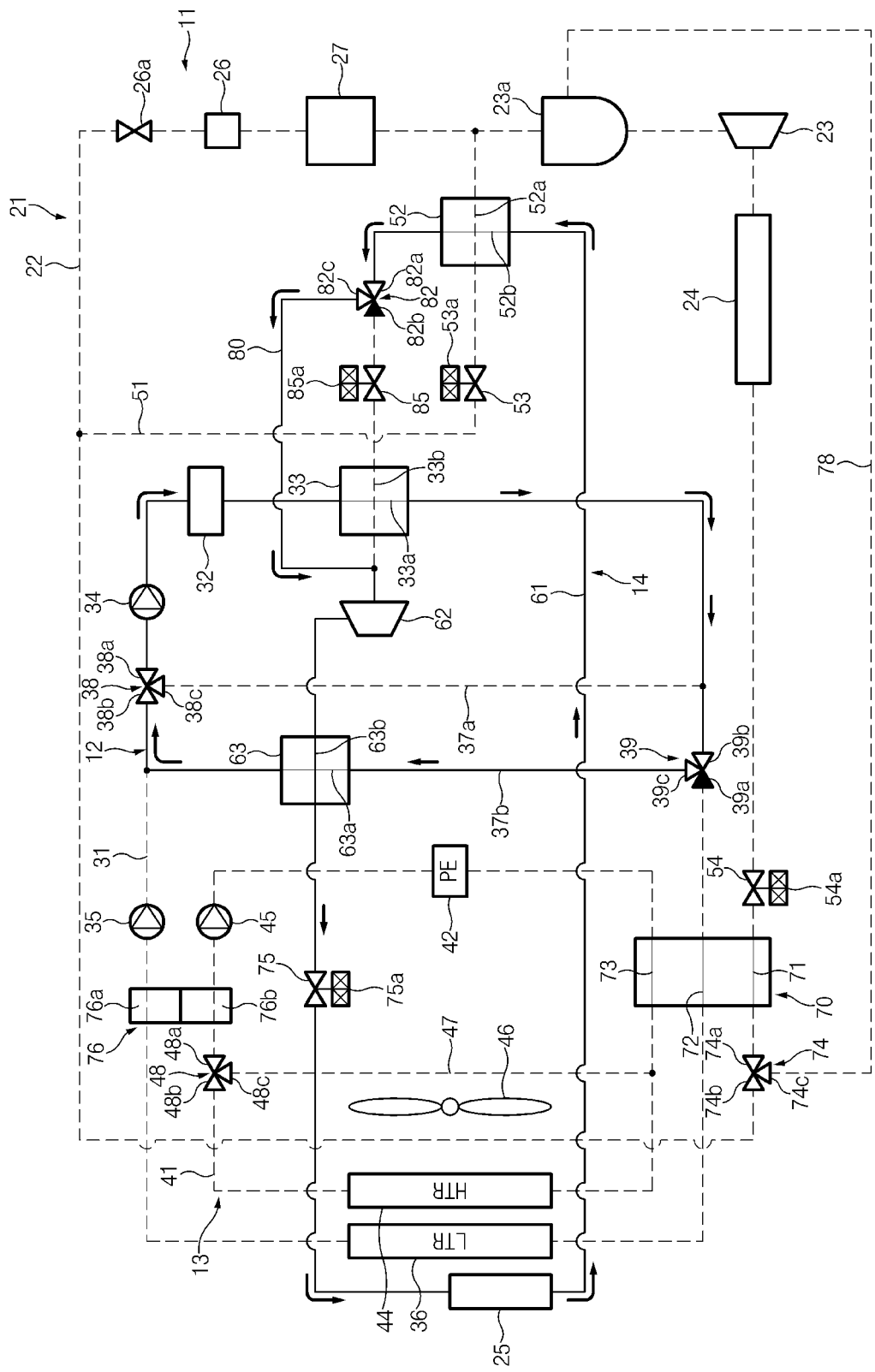
FIG. 3 illustrates a process in which a temperature of a battery is increased by a second refrigeration cycle and a battery cooling subsystem in the vehicle thermal management system illustrated in FIG. 1.

FIG. 3 shows that the temperature of the battery 32 is increased by the second refrigeration cycle 14 and the battery cooling subsystem 12. Referring to FIG. 3, the first compressor 23 of the first refrigeration cycle 21 may stop, the second compressor 62 of the second refrigeration cycle 14 may operate, and the first battery-side pump 34 of the battery cooling subsystem 12 may operate. The first three-way valve 38 of the battery cooling subsystem 12 may be switched to allow the second port 38b to communicate with the first port 38a (that is, the first three-way valve 38 may be switched to close the first battery bypass conduit 37a), the second three-way valve 39 of the battery cooling subsystem 12 may be switched to allow the second port 39b to communicate with the third port 39c (that is, the second three-way valve 39 may be switched to open the second battery bypass conduit 37b), and the chiller-side three-way valve 82 may be switched to allow the third port 82c to communicate with the first port 82a (that is, the chiller-side three-way valve 82 may be switched to open the chiller-side bypass conduit 80).

The battery-side coolant may sequentially pass through the battery 32, the second battery bypass conduit 37b, and the first passage 63a of the condenser 63 by the first battery-side pump 34.

The second refrigerant may sequentially pass through the second passage 63b of the condenser 63, the exterior heat exchanger 25, the second passage 52b of the refrigerant chiller 52, and the chiller-side bypass conduit 80 by the operation of the second compressor 62. The second refrigerant may be compressed by the second compressor 62, and the compressed second refrigerant may be condensed by the condenser 63. As the auxiliary expansion valve 75 is opened to a predetermined opening degree, the condensed second refrigerant may be expanded by the auxiliary expansion valve 75. As the expanded second refrigerant exchanges heat with the ambient air in the exterior heat exchanger 25, it may be evaporated and heated. As the heated second refrigerant passes through the chiller-side bypass conduit 80, the second refrigerant may not pass through the second passage 33b of the battery chiller 33, and accordingly the second refrigerant may not be cooled by the battery chiller 33. As the second refrigerant passing through the second passage 63b of the condenser 63 exchanges heat with the battery-side coolant passing through the first passage 63a of the condenser 63, the second refrigerant may be condensed and cooled by the battery-side coolant, and the battery-side coolant may be heated by the second refrigerant. The heated battery-side coolant may flow from the condenser 63 to the battery 32 in the battery coolant loop 31, and the heated battery-side coolant may increase the temperature of the battery 32. As described above, as the second refrigerant heated by the exterior heat exchanger 25 bypasses the second passage 33b of the battery chiller 33, the heated second refrigerant may heat the battery-side coolant in the condenser 63, and the heated battery-side coolant may increase the temperature of the battery 32.

Figure 4:
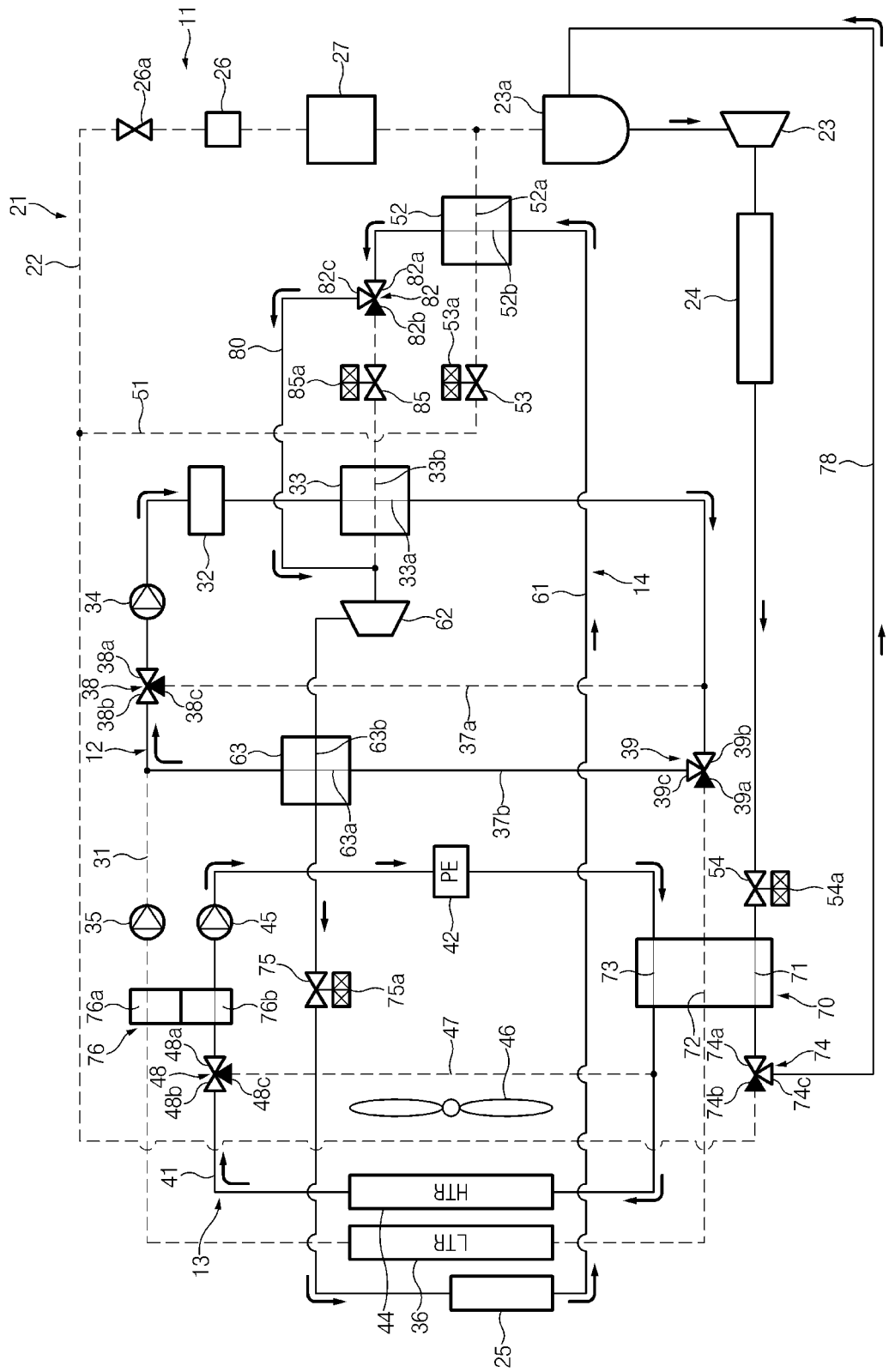
FIG. 4 illustrates a process in which an HVAC subsystem operates in a heating mode and a temperature of a battery is increased by a second refrigeration cycle and a battery cooling subsystem in the vehicle thermal management system illustrated in FIG. 1.

FIG. 4 shows that the HVAC subsystem 11 operates in a heating mode, and the temperature of the battery 32 is increased by the second refrigeration cycle 14 and the battery cooling subsystem 12. Referring to FIG. 4, the first compressor 23 of the first refrigeration cycle 21 may operate, the second compressor 62 of the second refrigeration cycle 14 may operate, the second battery-side pump 35 of the battery cooling subsystem 12 may stop, and the first battery-side pump 34 of the battery cooling subsystem 12 and the powertrain-side pump 45 of the powertrain cooling subsystem 13 may operate. The first three-way valve 38 of the battery cooling subsystem 12 may be switched to allow the second poll 38b to communicate with the first port 38a (that is, the first three-way valve 38 may be switched to close the first battery bypass conduit 37a), the second three-way valve 39 of the battery cooling subsystem 12 may be switched to allow the second port 39b to communicate with the third poll 39c (that is, the second three-way valve 39 may be switched to open the second battery bypass conduit 37b), the three-way valve 48 of the powertrain cooling subsystem 13 may be switched to allow the second port 48b to communicate with the first port 48a (that is, the three-way valve 48 of the powertrain cooling subsystem 13 may be switched to close the powertrain bypass conduit 47), and the chiller-side three-way valve 82 may be switched to allow the third port 82c to communicate with the first port 82a (that is, the chiller-side three-way valve 82 may be switched to open the chiller-side bypass conduit 80).

The battery-side coolant may sequentially pass through the battery 32 and the first passage 63a of the condenser 63 by the first battery-side pump 34. The second refrigerant may sequentially pass through the second passage 63b of the condenser 63, the exterior heat exchanger 25, the second passage 52b of the refrigerant chiller 52, and the chiller-side bypass conduit 80 by the operation of the second compressor 62. The second refrigerant may be compressed by the second compressor 62, and the compressed second refrigerant may be condensed by the condenser 63. As the auxiliary expansion valve 75 is opened to a predetermined opening degree, the condensed second refrigerant may be expanded by the auxiliary expansion valve 75. As the expanded second refrigerant exchanges heat with the ambient air in the exterior heat exchanger 25, it may be evaporated and heated. As the heated second refrigerant passes through the chiller-side bypass conduit 80, the second refrigerant may not pass through the second passage 33b of the battery chiller 33, and accordingly the second refrigerant may not be cooled by the battery chiller 33. As the second refrigerant passing through the second passage 63b of the condenser 63 exchanges heat with the battery-side coolant passing through the first passage 63a of the condenser 63, the second refrigerant may be condensed and cooled by the battery-side coolant, and the battery-side coolant may be heated by the second refrigerant. The heated battery-side coolant may flow from the condenser 63 to the battery 32 in the battery coolant loop 31, and the heated battery-side coolant may increase the temperature of the battery 32. As described above, as the second refrigerant heated by the exterior heat exchanger 25 bypasses the second passage 33b of the battery chiller 33, the heated second refrigerant may heat the battery-side coolant in the condenser 63, and the heated battery-side coolant may increase the temperature of the battery 32.

The three-way valve 74 of the HVAC subsystem 11 may be switched to allow the third port 74c to communicate with the first port 74a, and the second port 74b of the three-way valve 74 may be closed, and accordingly the first refrigerant may sequentially pass through the first compressor 23, the interior condenser 24, the heating-side expansion valve 54, the first passage 71 of the water-cooled heat exchanger 70, and the bypass conduit 78. The first refrigerant may be compressed by the first compressor 23, and the compressed first refrigerant may be condensed by the interior condenser 24. As the heating-side expansion valve 54 is opened to a predetermined opening degree, the condensed first refrigerant may be expanded by the heating-side expansion valve 54, and the expanded first refrigerant may pass through the first passage 71 of the water-cooled heat exchanger 70. As the first refrigerant passing through the first passage 71 of the water-cooled heat exchanger 70 exchanges heat with the powertrain-side coolant passing through the third passage 73 of the water-cooled heat exchanger 70, the first refrigerant may be evaporated. As described above, as the HVAC subsystem 11 operates in the heating mode, the heating of the passenger compartment may be performed.

Figure 5:
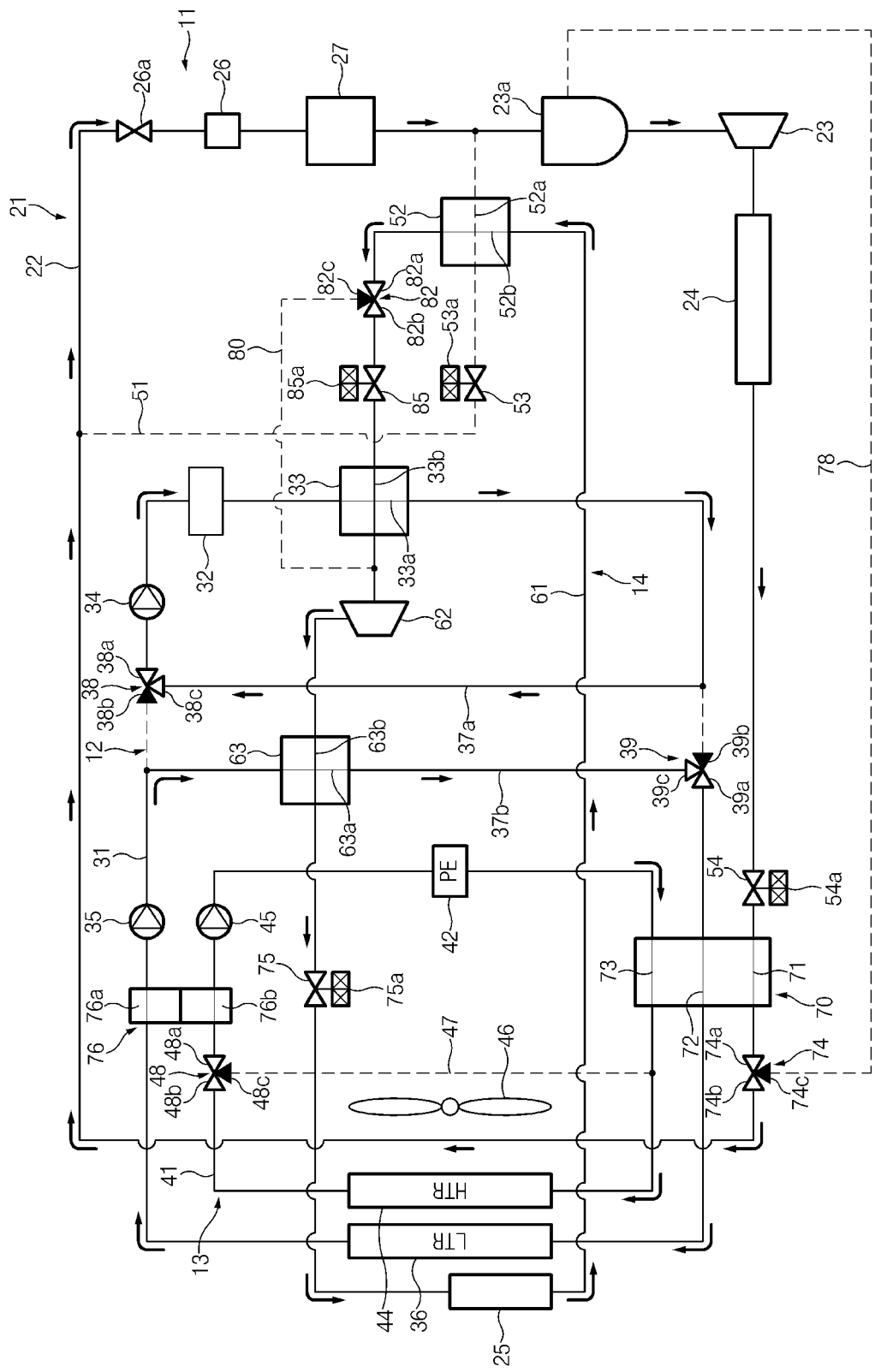
FIG. 5 illustrates a process in which an HVAC subsystem operates in a cooling mode and a battery is cooled by a second refrigeration cycle and a battery cooling subsystem in the vehicle thermal management system illustrated in FIG. 1.

FIG. 5 shows that the HVAC subsystem 11 operates in a cooling mode, and the battery 32 is cooled by the second refrigeration cycle 14 and the battery cooling subsystem 12. Referring to FIG. 5, the first compressor 23 of the first refrigeration cycle 21 may operate, the second compressor 62 of the second refrigeration cycle 14 may operate, the first battery-side pump 34 and the second battery-side pump 35 of the battery cooling subsystem 12 may operate, and the powertrain-side pump 45 of the powertrain cooling subsystem 13 may operate. The first three-way valve 38 of the battery cooling subsystem 12 may be switched to allow the third port 38c to communicate with the first port 38a (that is, the first three-way valve 38 of the battery cooling subsystem 12 may be switched to open the first battery bypass conduit 37a), the second three-way valve 39 of the battery cooling subsystem 12 may be switched to allow the third port 39c to communicate with the first port 39a (that is, the second three-way valve 39 of the battery cooling subsystem 12 may be switched to open the second battery bypass conduit 37b), the three-way valve 48 of the powertrain cooling subsystem 13 may be switched to allow the second port 48b to communicate with the first port 48a (that is, the three-way valve 48 of the powertrain cooling subsystem 13 may be switched to close the powertrain bypass conduit 47), the chiller-side three-way valve 82 may be switched to allow the second port 82b to communicate with the first port 82a (that is, the chiller-side three-way valve 82 may be switched to close the chiller-side bypass conduit 80), and the three-way valve 74 of the first refrigeration cycle 21 may be switched to allow the second port 74b to communicate with the first port 74a (that is, the three-way valve 74 of the first refrigeration cycle 21 may be switched to close the bypass conduit 78).

A portion of the battery-side coolant may sequentially pass through the battery 32 and the first passage 33a of the battery chiller 33 by the first battery-side pump 34. A remaining portion of the battery-side coolant may sequentially pass through the first passage 63a of the condenser 63, the second passage 72 of the water-cooled heat exchanger 70, and the battery radiator 36 by the second battery-side pump 35.

The first refrigerant may sequentially pass through the interior condenser 24, the first passage 71 of the water-cooled heat exchanger 70, the cooling-side expansion valve 26, and the evaporator 27 by the operation of the first compressor 23. Here, the heating-side expansion valve 54 may be fully opened (the opening degree of the heating-side expansion valve 54 may be 100%), and the first refrigerant may not be expanded when passing through the heating-side expansion valve 54. As the first chiller-side expansion valve 53 is fully closed, the first refrigerant may not pass through the branch conduit 51, and the second refrigerant may not exchange heat with the first refrigerant in the refrigerant chiller 52. That is, the second refrigeration cycle 14 may be thermally separated from the first refrigeration cycle 21. The first refrigerant may be compressed by the first compressor 23, and the compressed first refrigerant may be condensed by the interior condenser 24 and the water-cooled heat exchanger 70. As the shut-off valve 26a is opened, the condensed first refrigerant may be expanded by the cooling-side expansion valve 26, and the expanded first refrigerant may be evaporated by the evaporator 27.

The second refrigerant may sequentially pass through the second passage 63b of the condenser 63, the exterior heat exchanger 25, the second passage 52b of the refrigerant chiller 52, and the second passage 33b of the battery chiller 33 by the operation of the second compressor 62. The second refrigerant may be compressed by the second compressor 62, and the compressed second refrigerant may be primarily condensed by the condenser 63. The auxiliary expansion valve 75 may be fully opened (the opening degree of the auxiliary expansion valve 75 may be 100%), and the condensed second refrigerant may not be expanded when passing through the auxiliary expansion valve 75. As the second refrigerant exchanges heat with the ambient air in the exterior heat exchanger 25, the second refrigerant may be secondarily condensed. As the second chiller-side expansion valve 85 is opened to a predetermined degree, the second refrigerant condensed by the exterior heat exchanger 25 may be expanded by the second chiller-side expansion valve 85, and the expanded second refrigerant may be evaporated by the battery chiller 33. As the second refrigerant passing through the second passage 33b of the battery chiller 33 exchanges heat with the battery-side coolant passing through the first passage 33a of the battery chiller 33, the battery-side coolant may be cooled and condensed by the second refrigerant, and the cooled battery-side coolant may cool the battery 32. That is, the battery 32 may only be cooled by the second refrigeration cycle 14 which is thermally separated from the first refrigeration cycle 21.

Figure 6:
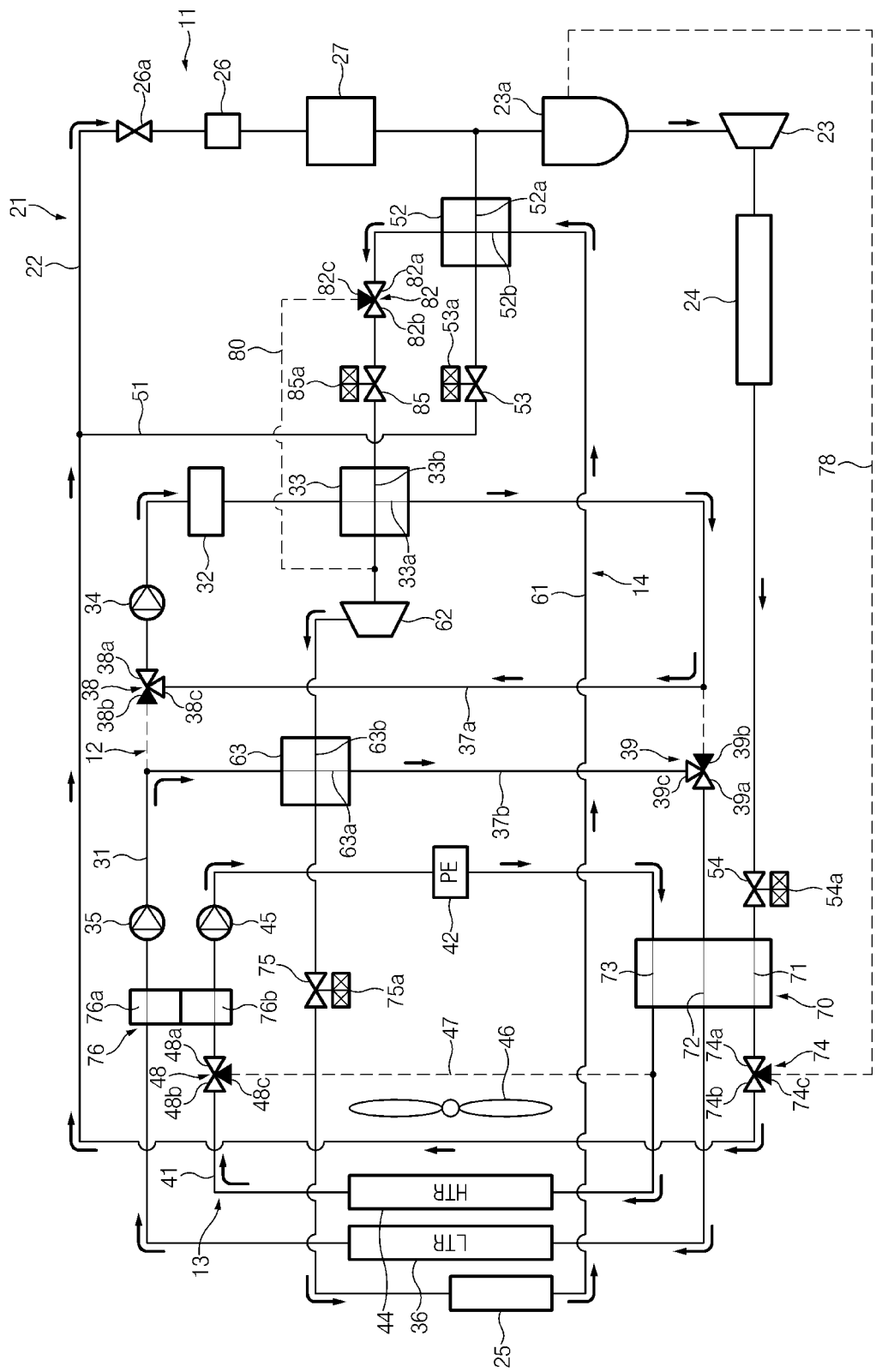
FIG. 6 illustrates a process in which an HVAC subsystem operates in a cooling mode and a battery is cooled by a first refrigeration cycle, a second refrigeration cycle, and a battery cooling subsystem in the vehicle thermal management system illustrated in FIG. 1.

FIG. 6 shows that the HVAC subsystem 11 operates in a cooling mode, and the battery 32 is cooled by the first refrigeration cycle 21, the second refrigeration cycle 14, and the battery cooling subsystem 12. Referring to FIG. 6, the first compressor 23 of the first refrigeration cycle 21 may operate, the second compressor 62 of the second refrigeration cycle 14 may operate, the first battery-side pump 34 and the second battery-side pump 35 of the battery cooling subsystem 12 may operate, and the powertrain-side pump 45 of the powertrain cooling subsystem 13 may operate. The first three-way valve 38 of the battery cooling subsystem 12 may be switched to allow the third poll 38c to communicate with the first port 38a (that is, the first three-way valve 38 of the battery cooling subsystem 12 may be switched to open the first battery bypass conduit 37a), the second three-way valve 39 of the battery cooling subsystem 12 may be switched to allow the third port 39c to communicate with the first poll 39a (that is, the second three-way valve 39 of the battery cooling subsystem 12 may be switched to open the second battery bypass conduit 37b), the three-way valve 48 of the powertrain cooling subsystem 13 may be switched to allow the second poll 48b to communicate with the first port 48a (that is, the three-way valve 48 of the powertrain cooling subsystem 13 may be switched to close the powertrain bypass conduit 47), the chiller-side three-way valve 82 may be switched to allow the second port 82b to communicate with the first port 82a (that is, the chiller-side three-way valve 82 may be switched to close the chiller-side bypass conduit 80), and the three-way valve 74 of the first refrigeration cycle 21 may be switched to allow the second port 74b to communicate with the first port 74a (that is, the three-way valve 74 of the first refrigeration cycle 21 may be switched to close the bypass conduit 78).

A portion of the battery-side coolant may sequentially pass through the battery 32 and the first passage 33a of the battery chiller 33 by the first battery-side pump 34. A remaining portion of the battery-side coolant may sequentially pass through the first passage 63a of the condenser 63, the second passage 72 of the water-cooled heat exchanger 70, and the battery radiator 36 by the second battery-side pump 35.

The first refrigerant may sequentially pass through the interior condenser 24, the first passage 71 of the water-cooled heat exchanger 70, the cooling-side expansion valve 26, and the evaporator 27 by the operation of the first compressor 23. The first refrigerant may be compressed by the first compressor 23, and the compressed first refrigerant may be condensed by the interior condenser 24 and the water-cooled heat exchanger 70. The condensed first refrigerant may be expanded by the cooling-side expansion valve 26, and the expanded first refrigerant may be evaporated by the evaporator 27. In addition, a portion of the first refrigerant may be directed into the first chiller-side expansion valve 53 through the branch conduit 51. As the first chiller-side expansion valve 53 is opened to a predetermined degree, the first refrigerant may be expanded, and the expanded first refrigerant may pass through the first passage 52a of the refrigerant chiller 52. As the second refrigerant passes through the second passage 52b of the refrigerant chiller 52, the first refrigerant may exchange heat with the second refrigerant in the refrigerant chiller 52. The first refrigerant may be evaporated by the second refrigerant in the refrigerant chiller 52, and the second refrigerant may be condensed by the first refrigerant in the refrigerant chiller 52. That is, the second refrigeration cycle 14 may be thermally connected to the first refrigeration cycle 21 through the refrigerant chiller 52.

The second refrigerant may sequentially pass through the second passage 63b of the condenser 63, the exterior heat exchanger 25, the second passage 52b of the refrigerant chiller 52, and the second passage 33b of the battery chiller 33 by the operation of the second compressor 62. The second refrigerant may be compressed by the second compressor 62, and the compressed second refrigerant may be primarily condensed by the condenser 63. As the condensed second refrigerant exchanges heat with the ambient air in the exterior heat exchanger 25, the second refrigerant may be secondarily condensed. Here, the auxiliary expansion valve 75 may be fully opened (the opening degree of the auxiliary expansion valve 75 may be 100%), and the condensed second refrigerant may not be expanded when passing through the auxiliary expansion valve 75. The second refrigerant condensed by the exterior heat exchanger 25 may be tertiarily condensed by the refrigerant chiller 52. The condensed second refrigerant may be expanded by the second chiller-side expansion valve 85, and the expanded second refrigerant may be evaporated by the battery chiller 33. As the second refrigerant passing through the second passage 33b of the battery chiller 33 exchanges heat with the battery-side coolant passing through the first passage 33a of the battery chiller 33, the battery-side coolant may be cooled and condensed by the second refrigerant, and the cooled battery-side coolant may cool the battery 32. That is, the battery 32 may be cooled by the first refrigeration cycle 21 and the second refrigeration cycle 14 which are thermally connected to each other.

Figure 7:
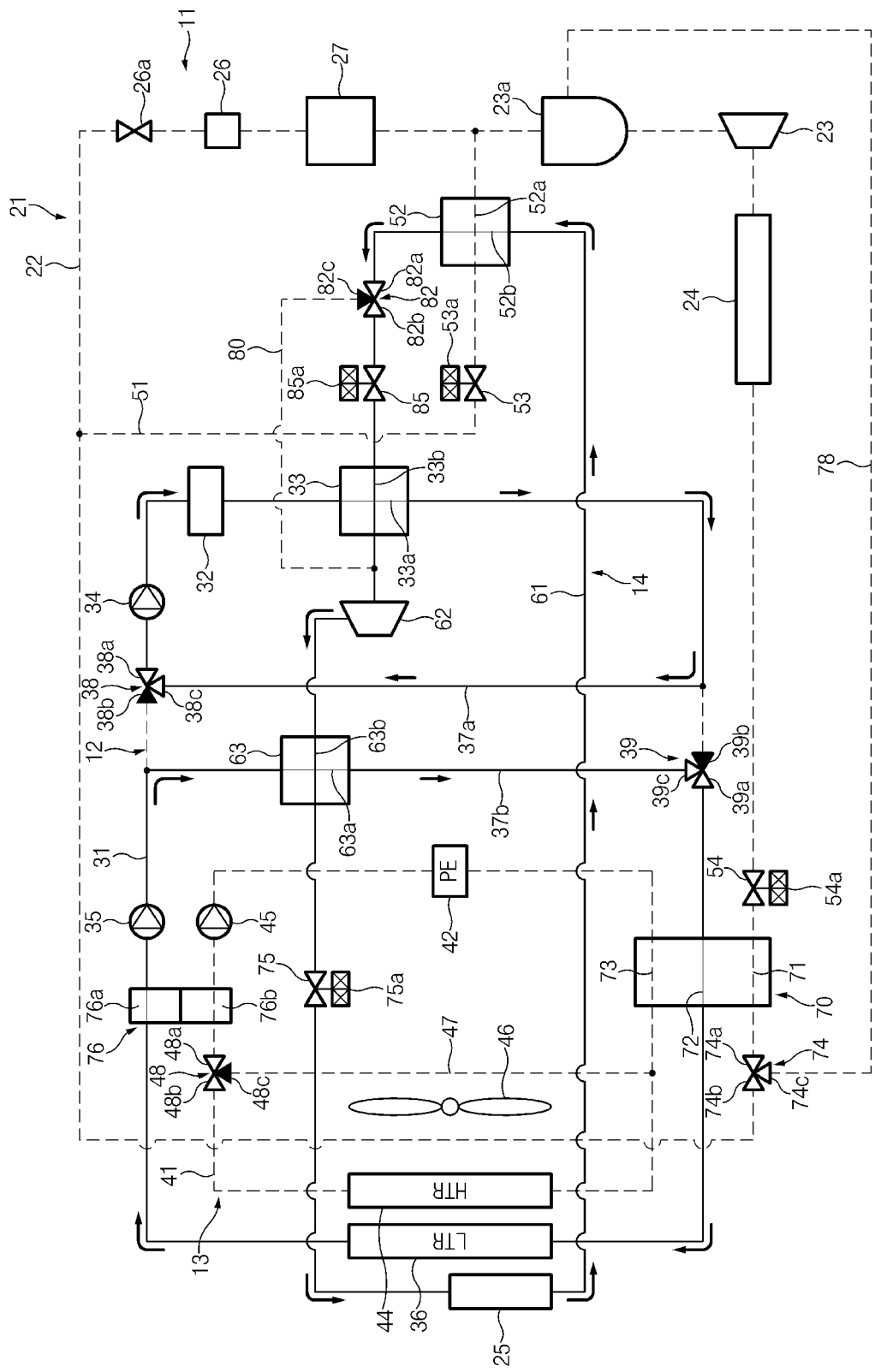
FIG. 7 illustrates a process in which a battery is cooled by a second refrigeration cycle and a battery cooling subsystem in the vehicle thermal management system illustrated in FIG. 1.

FIG. 7 shows that the battery 32 is cooled by the second refrigeration cycle 14 and the battery cooling subsystem 12. Referring to FIG. 7, the first compressor 23 of the first refrigeration cycle 21 may stop, the second compressor 62 of the second refrigeration cycle 14 may operate, the first battery-side pump 34 and the second battery-side pump 35 of the battery cooling subsystem 12 may operate, and the powertrain-side pump 45 of the powertrain cooling subsystem 13 may stop. The first three-way valve 38 of the battery cooling subsystem 12 may be switched to allow the third port 38c to communicate with the first port 38a (that is, the first three-way valve 38 of the battery cooling subsystem 12 may be switched to open the first battery bypass conduit 37a), the second three-way valve 39 of the battery cooling subsystem 12 may be switched to allow the third port 39c to communicate with the first port 39a (that is, the second three-way valve 39 of the battery cooling subsystem 12 may be switched to open the second battery bypass conduit 37b), and the chiller-side three-way valve 82 may be switched to allow the second port 82b to communicate with the first port 82a (that is, the chiller-side three-way valve 82 may be switched to close the chiller-side bypass conduit 80).

A portion of the battery-side coolant may sequentially pass through the battery 32 and the first passage 33a of the battery chiller 33 by the first battery-side pump 34. A remaining portion of the battery-side coolant may sequentially pass through the first passage 63a of the condenser 63, the second passage 72 of the water-cooled heat exchanger 70, and the battery radiator 36 by the second battery-side pump 35.

The second refrigerant may sequentially pass through the second passage 63b of the condenser 63, the exterior heat exchanger 25, the second passage 52b of the refrigerant chiller 52, and the second passage 33b of the battery chiller 33 by the operation of the second compressor 62. The second refrigerant may be compressed by the second compressor 62, and the compressed second refrigerant may be primarily condensed by the condenser 63. As the condensed second refrigerant exchanges heat with the ambient air in the exterior heat exchanger 25, the second refrigerant may be secondarily condensed. Here, the auxiliary expansion valve 75 may be fully opened (the opening degree of the auxiliary expansion valve 75 may be 100%), and the condensed second refrigerant may not be expanded when passing through the auxiliary expansion valve 75. The second refrigerant condensed by the exterior heat exchanger 25 may be expanded by the second chiller-side expansion valve 85, and the expanded second refrigerant may be evaporated by the battery chiller 33. As the second refrigerant passing through the second passage 33b of the battery chiller 33 exchanges heat with the battery-side coolant passing through the first passage 33a of the battery chiller 33, the battery-side coolant may be cooled and condensed by the second refrigerant, and the cooled battery-side coolant may cool the battery 32. That is, the battery 32 may only be cooled by the second refrigeration cycle 14.

Figure 8:
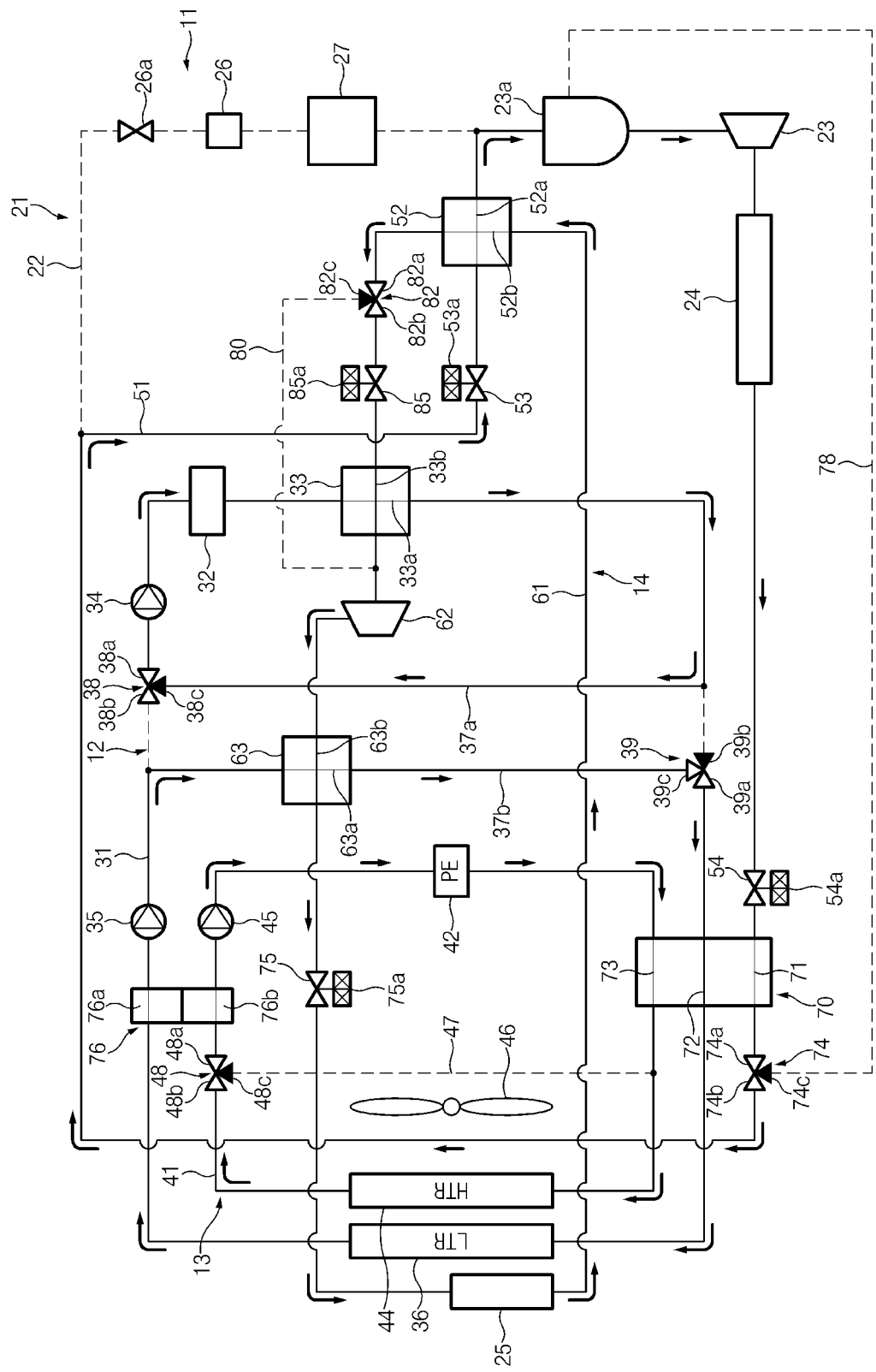
FIG. 8 illustrates a process in which a battery is cooled by a first refrigeration cycle, a second refrigeration cycle, and a battery cooling subsystem in the vehicle thermal management system illustrated in FIG. 1.

FIG. 8 shows that the battery 32 is cooled by the first refrigeration cycle 21, the second refrigeration cycle 14, and the battery cooling subsystem 12. Referring to FIG. 8, the first compressor 23 of the first refrigeration cycle 21 may operate, the second compressor 62 of the second refrigeration cycle 14 may operate, the first battery-side pump 34 and the second battery-side pump 35 of the battery cooling subsystem 12 may operate, and the powertrain-side pump 45 of the powertrain cooling subsystem 13 may operate. The first three-way valve 38 of the battery cooling subsystem 12 may be switched to allow the third port 38c to communicate with the first port 38a (that is, the first three-way valve 38 of the battery cooling subsystem 12 may be switched to open the first battery bypass conduit 37a), the second three-way valve 39 of the battery cooling subsystem 12 may be switched to allow the third port 39c to communicate with the first port 39a (that is, the second three-way valve 39 of the battery cooling subsystem 12 may be switched to open the second battery bypass conduit 37b), the three-way valve 48 of the powertrain cooling subsystem 13 may be switched to allow the second port 48b to communicate with the first port 48a (that is, the three-way valve 48 of the powertrain cooling subsystem 13 may be switched to close the powertrain bypass conduit 47), the chiller-side three-way valve 82 may be switched to allow the second port 82b to communicate with the first port 82a (that is, the chiller-side three-way valve 82 may be switched to close the chiller-side bypass conduit 80), and the three-way valve 74 of the first refrigeration cycle 21 may be switched to allow the second port 74b to communicate with the first port 74a (that is, the three-way valve 74 of the first refrigeration cycle 21 may be switched to close the bypass conduit 78).

A portion of the battery-side coolant may sequentially pass through the battery 32 and the first passage 33a of the battery chiller 33 by the first battery-side pump 34. A remaining portion of the battery-side coolant may sequentially pass through the first passage 63a of the condenser 63, the second passage 72 of the water-cooled heat exchanger 70, and the battery radiator 36 by the second battery-side pump 35.

The first refrigerant may sequentially pass through the interior condenser 24, the first passage 71 of the water-cooled heat exchanger 70, the first chiller-side expansion valve 53, and the refrigerant chiller 52 by the operation of the first compressor 23. The first refrigerant may be compressed by the first compressor 23, and the compressed first refrigerant may be condensed by the interior condenser 24 and the water-cooled heat exchanger 70. The condensed first refrigerant may be directed into the first chiller-side expansion valve 53 through the branch conduit 51. As the first chiller-side expansion valve 53 is opened to a predetermined degree, the first refrigerant may be expanded, and the expanded first refrigerant may pass through the first passage 52a of the refrigerant chiller 52. As the second refrigerant passes through the second passage 52b of the refrigerant chiller 52, the first refrigerant may exchange heat with the second refrigerant in the refrigerant chiller 52. That is, the second refrigeration cycle 14 may be thermally connected to the first refrigeration cycle 21 through the refrigerant chiller 52. In addition, as the shut-off valve 26a is fully closed, the first refrigerant may not flow into the cooling-side expansion valve 26 and the evaporator 27.

The second refrigerant may sequentially pass through the second passage 63b of the condenser 63, the exterior heat exchanger 25, the second passage 52b of the refrigerant chiller 52, and the second passage 33b of the battery chiller 33 by the operation of the second compressor 62. The second refrigerant may be compressed by the second compressor 62, and the compressed second refrigerant may be primarily condensed by the condenser 63. As the condensed second refrigerant exchanges heat with the ambient air in the exterior heat exchanger 25, the second refrigerant may be secondarily condensed. Here, the auxiliary expansion valve 75 may be fully opened (the opening degree of the auxiliary expansion valve 75 may be 100%), and the condensed second refrigerant may not be expanded when passing through the auxiliary expansion valve 75. The second refrigerant condensed by the exterior heat exchanger 25 may be tertiarily condensed by the refrigerant chiller 52. The condensed second refrigerant may be expanded by the second chiller-side expansion valve 85, and the expanded second refrigerant may be evaporated by the battery chiller 33. As the second refrigerant passing through the second passage 33b of the battery chiller 33 exchanges heat with the battery-side coolant passing through the first passage 33a of the battery chiller 33, the battery-side coolant may be cooled and condensed by the second refrigerant, and the cooled battery-side coolant may cool the battery 32. That is, the battery 32 may be cooled by the first refrigeration cycle 21 and the second refrigeration cycle 14 which are thermally connected to each other.

As set forth above, the vehicle thermal management system according to exemplary embodiments of the present disclosure may allow the second refrigeration cycle, which is configured independently of the first refrigeration cycle of the HVAC subsystem, to selectively cool or heat the battery-side coolant circulating in the battery coolant loop, thereby effectively cooling or heating the battery. Accordingly, the vehicle thermal management system can remove an electric heater for heating the battery-side coolant, thereby reducing the waste of electric energy and significantly improving thermal management performance with respect to the battery.

According to exemplary embodiments of the present disclosure, the second refrigeration cycle may be thermally connected to the first refrigeration cycle of the HVAC subsystem through the refrigerant chiller and be thermally connected to the battery coolant loop of the battery cooling subsystem through the battery chiller, and thus the first refrigeration cycle, the second refrigeration cycle, and the battery cooling subsystem may form a cascade refrigeration cycle. Accordingly, the operation of the HVAC subsystem and the cooling or heating of the battery may be performed simultaneously or independently.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:
1. A vehicle thermal management system comprising:
    a first refrigeration cycle including a first refrigerant loop in which a first refrigerant is circulated;
    a battery cooling subsystem including a battery coolant loop in which a battery-side coolant is circulated, wherein the battery coolant loop is fluidly connected to a battery;
    a second refrigeration cycle including a second refrigerant loop in which a second refrigerant is circulated, the second refrigeration cycle comprising a condenser thermally connected to the battery cooling subsystem;
    a refrigerant chiller thermally connecting the first refrigeration cycle and the second refrigeration cycle; and
    a battery chiller thermally connecting the second refrigeration cycle and the battery cooling subsystem, wherein the condenser is located on a downstream side of the battery chiller in the second refrigerant loop;
    wherein the second refrigeration cycle comprises:
        a chiller-side bypass conduit configured to allow the second refrigerant to bypass the battery chiller; and
        a chiller-side three-way valve configured to control a flow of the second refrigerant between the chiller-side bypass conduit and the second refrigerant loop.
2. The vehicle thermal management system according to claim 1, wherein the second refrigeration cycle further comprises:

a compressor located on an upstream side of the condenser; and an exterior heat exchanger located on a downstream side of the compressor.

3. The vehicle thermal management system according to claim 2, wherein the second refrigeration cycle further comprises an auxiliary expansion valve disposed between the condenser and the exterior heat exchanger.

4. The vehicle thermal management system according to claim 1, wherein the first refrigeration cycle comprises:
a compressor;
an interior condenser located on a downstream side of the compressor;
a cooling-side expansion valve located on a downstream side of the interior condenser; and
an evaporator located on a downstream side of the cooling-side expansion valve.

5. The vehicle thermal management system according to claim 1, wherein:
the first refrigeration cycle further comprises a branch conduit branching off from the first refrigerant loop; and
the refrigerant chiller is configured to transfer heat between the branch conduit and the second refrigerant loop.

6. The vehicle thermal management system according to claim 5, wherein the refrigerant chiller comprises a first passage fluidly connected to the branch conduit and a second passage fluidly connected to the second refrigerant loop.

7. The vehicle thermal management system according to claim 1, wherein the first refrigeration cycle comprises a first chiller-side expansion valve located on an upstream side of the refrigerant chiller.

8. The vehicle thermal management system according to claim 1, further comprising a water-cooled heat exchanger configured to transfer heat between the first refrigerant loop of the first refrigeration cycle and the battery coolant loop of the battery cooling subsystem.

9. The vehicle thermal management system according to claim 8, wherein:
the water-cooled heat exchanger comprises a first passage fluidly connected to the first refrigerant loop and a second passage fluidly connected to the battery coolant loop; and
the first refrigeration cycle comprises a heating-side expansion valve located on an upstream side of the first passage of the water-cooled heat exchanger.

10. The vehicle thermal management system according to claim 1, wherein the battery chiller comprises a first passage fluidly connected to the battery coolant loop and a second passage fluidly connected to the second refrigerant loop.

11. The vehicle thermal management system according to claim 10, wherein:
the first passage is located on a downstream side of the battery in the battery coolant loop; and
the second passage is located on a downstream side of the refrigerant chiller in the second refrigerant loop.

12. The vehicle thermal management system according to claim 11, wherein the second refrigeration cycle comprises a chiller-side expansion valve located on an upstream side of the second passage of the battery chiller.

13. A vehicle thermal management system comprising:
a first refrigeration cycle including a first refrigerant loop in which a first refrigerant is circulated;
a battery cooling subsystem including a battery coolant loop in which a battery-side coolant is circulated, wherein the battery coolant loop is fluidly connected to a battery;
a second refrigeration cycle including a second refrigerant loop in which a second refrigerant is circulated, the second refrigeration cycle comprising a condenser thermally connected to the battery cooling subsystem;
a refrigerant chiller thermally connecting the first refrigeration cycle and the second refrigeration cycle; and
a battery chiller thermally connecting the second refrigeration cycle and the battery cooling subsystem, wherein the condenser is located on a downstream side of the battery chiller in the second refrigerant loop;
wherein the battery cooling subsystem comprises:
a battery radiator located on a downstream side of the battery chiller;
a first battery bypass conduit configured to allow the battery-side coolant to bypass the battery radiator;
a second battery bypass conduit configured to allow the battery-side coolant to bypass the battery and the battery chiller; and
a three-way valve configured to adjust a flow direction of the battery-side coolant.

14. The vehicle thermal management system according to claim 13, wherein the condenser comprises:
a first passage fluidly connected to the battery coolant loop and fluidly connected to the second battery bypass conduit; and
a second passage fluidly connected to the second refrigerant loop.

15. The vehicle thermal management system according to claim 13, wherein the second refrigeration cycle comprises:
a chiller-side bypass conduit configured to allow the second refrigerant to bypass the battery chiller; and
a chiller-side three-way valve configured to control a flow of the second refrigerant between the chiller-side bypass conduit and the second refrigerant loop.

16. The vehicle thermal management system according to claim 14, wherein:
the first refrigeration cycle further comprises a branch conduit branching off from the first refrigerant loop; and
the refrigerant chiller is configured to transfer heat between the branch conduit and the second refrigerant loop.

17. A method of operating a vehicle thermal management system, the method comprising:
circulating a first refrigerant in a first refrigerant loop of a first refrigeration cycle;
circulating a battery-side coolant in a battery coolant loop of a battery cooling subsystem, wherein the battery coolant loop is fluidly connected to a battery; and
circulating a second refrigerant in a second refrigerant loop of a second refrigeration cycle, the second refrigeration cycle comprising a condenser thermally connected to the battery cooling subsystem;
wherein a refrigerant chiller thermally connects the first refrigeration cycle and the second refrigeration cycle;
wherein a battery chiller thermally connects the second refrigeration cycle and the battery cooling subsystem;
wherein the condenser is located on a downstream side of the battery chiller in the second refrigerant loop; and
wherein circulating the second refrigerant comprises:
allowing the second refrigerant to bypass the battery chiller using a chiller-side bypass conduit; and controlling a flow of the second refrigerant between the chiller-side bypass conduit and the second refrigerant loop using a chiller-side three-way valve.

18. The method according to claim 17, wherein the second refrigeration cycle comprises:
   a compressor located on an upstream side of the condenser; and
   an exterior heat exchanger located on a downstream side of the compressor.

19. The method according to claim 18, wherein the second refrigeration cycle further comprises an auxiliary expansion valve disposed between the condenser and the exterior heat exchanger.

20. The method according to claim 17, wherein the first refrigeration cycle comprises:
   a compressor;
   an interior condenser located on a downstream side of the compressor;
   a cooling-side expansion valve located on a downstream side of the interior condenser; and
   an evaporator located on a downstream side of the cooling-side expansion valve.

* * * * *

UNITED STATES PATENT AND TRADEMARK OFFICE
CERTIFICATE OF CORRECTION

| | |
|---|---|
| PATENT NO. | : 12,168,386 B2 |
| APPLICATION NO. | : 17/869123 |
| DATED | : December 17, 2024 |
| INVENTOR(S) | : Kim et al. |

It is certified that error appears in the above-identified patent and that said Letters Patent is hereby corrected as shown below:

In the Claims

In Column 28, in Claim 16, Line 41, delete "claim 14," and insert -- claim 13, --.

Signed and Sealed this
Eighteenth Day of February, 2025

Coke Morgan Stewart
*Acting Director of the United States Patent and Trademark Office*